US008947259B2

(12) United States Patent
Tagawa et al.

(10) Patent No.: US 8,947,259 B2
(45) Date of Patent: Feb. 3, 2015

(54) VEHICLE WRONG-WAY TRAVEL DETECTION DEVICE

(71) Applicant: Clarion Co., Ltd., Saitama-shi, Saitama (JP)

(72) Inventors: Shinya Tagawa, Saitama (JP); Keisuke Mutou, Saitama (JP); Hajime Kasai, Yokohama (JP); Akihiko Kouzai, Yokohama (JP)

(73) Assignee: Clarion Co., Ltd., Saitama-shi (JP)

( * ) Notice: Subject to any disclaimer, the term of this patent is extended or adjusted under 35 U.S.C. 154(b) by 0 days.

(21) Appl. No.: 14/268,206

(22) Filed: May 2, 2014

(65) Prior Publication Data
US 2014/0244146 A1    Aug. 28, 2014

Related U.S. Application Data

(63) Continuation of application No. 13/634,106, filed as application No. PCT/JP2011/055830 on Mar. 11, 2011, now Pat. No. 8,754,782.

(30) Foreign Application Priority Data

Mar. 12, 2010    (JP) ................................. 2010-056405

(51) Int. Cl.
G08G 1/09        (2006.01)
G08G 1/0962     (2006.01)
(Continued)

(52) U.S. Cl.
CPC ............. *G08G 1/0962* (2013.01); *G08G 1/075* (2013.01); *G01C 21/3697* (2013.01)
USPC ............ 340/905; 340/438; 340/935; 701/409

(58) Field of Classification Search
USPC ............. 340/901, 903, 905, 928, 935, 425.5, 340/435, 438; 701/409, 435, 300, 301
See application file for complete search history.

(56) References Cited

U.S. PATENT DOCUMENTS 8,125,349 B2 *    2/2012  May ............................. 340/907
8,428,861 B1 *    4/2013  Williams et al. ............. 701/301
(Continued)

FOREIGN PATENT DOCUMENTS

CN    1712900 A    12/2005
CN    101111875 A    1/2008
(Continued)

OTHER PUBLICATIONS

International Search Report dated May 24, 2011 (two (2) pages).

*Primary Examiner* — Brent Swarthout
(74) *Attorney, Agent, or Firm* — Crowell & Moring LLP

(57) ABSTRACT

A vehicle wrong-way travel detection device includes a map information storage unit where map information is stored, a decision-making point setting unit that sets, based upon the map information stored in the map information storage unit, the connecting point located ahead along a subject vehicle traveling direction as a decision-making point, a wrong-way travel decision-making area setting unit that sets wrong-way travel decision-making areas for at least one of a plurality of roads connected to the decision-making point, and a wrong-way travel decision-making unit that makes a decision, based upon the direction of traffic flow set for a unidirectional traffic road connected to the decision-making point and the subject vehicle traveling direction, as to whether or not the subject vehicle is traveling against the flow of traffic on the unidirectional traffic road.

10 Claims, 19 Drawing Sheets

Figure 1:
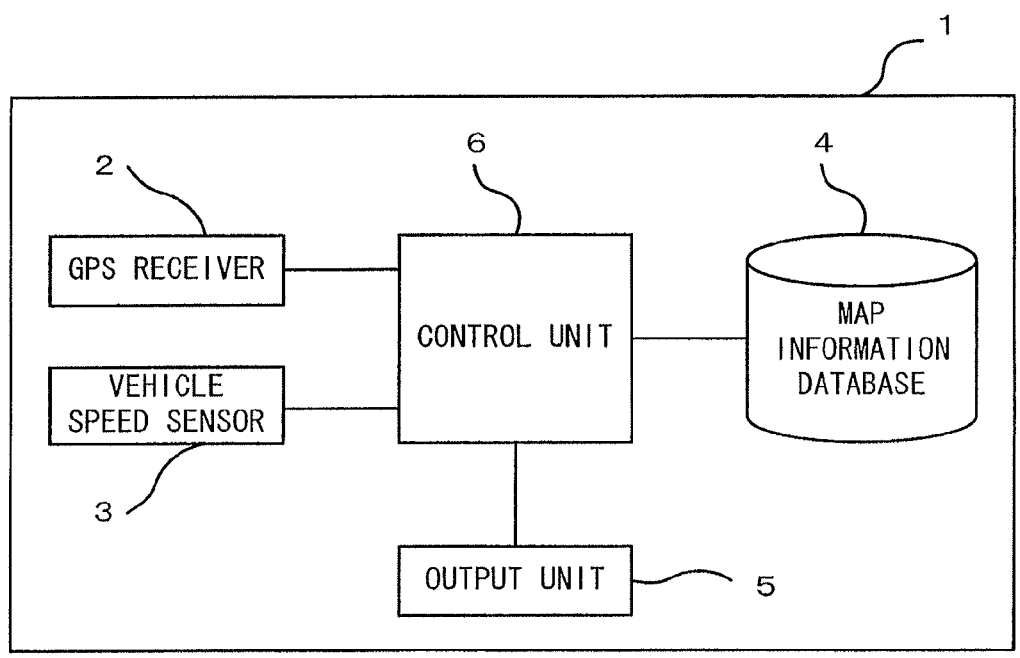

(51) Int. Cl.
 *G08G 1/07* (2006.01)
 *G01C 21/36* (2006.01)

(56) References Cited

U.S. PATENT DOCUMENTS

| | | |
|---|---|---|
| 2005/0171694 A1 | 8/2005 | Schirmer et al. |
| 2006/0080034 A1 | 4/2006 | Hayashi |
| 2009/0102683 A1 | 4/2009 | May |
| 2010/0207787 A1 | 8/2010 | Catten et al. |
| 2011/0121992 A1 | 5/2011 | Konaka et al. |
| 2012/0290150 A1* | 11/2012 | Doughty et al. .................. 701/2 |
| 2013/0147639 A1 | 6/2013 | Wietfeld et al. |
| 2013/0162448 A1 | 6/2013 | Mochizuki et al. |

FOREIGN PATENT DOCUMENTS

| | | |
|---|---|---|
| JP | 4-345190 A | 12/1992 |
| JP | 2007-139531 A | 6/2007 |
| JP | 2009-168548 A | 7/2009 |
| JP | 2010-169580 A | 8/2010 |
| WO | WO 2009/011043 A1 | 1/2009 |

* cited by examiner

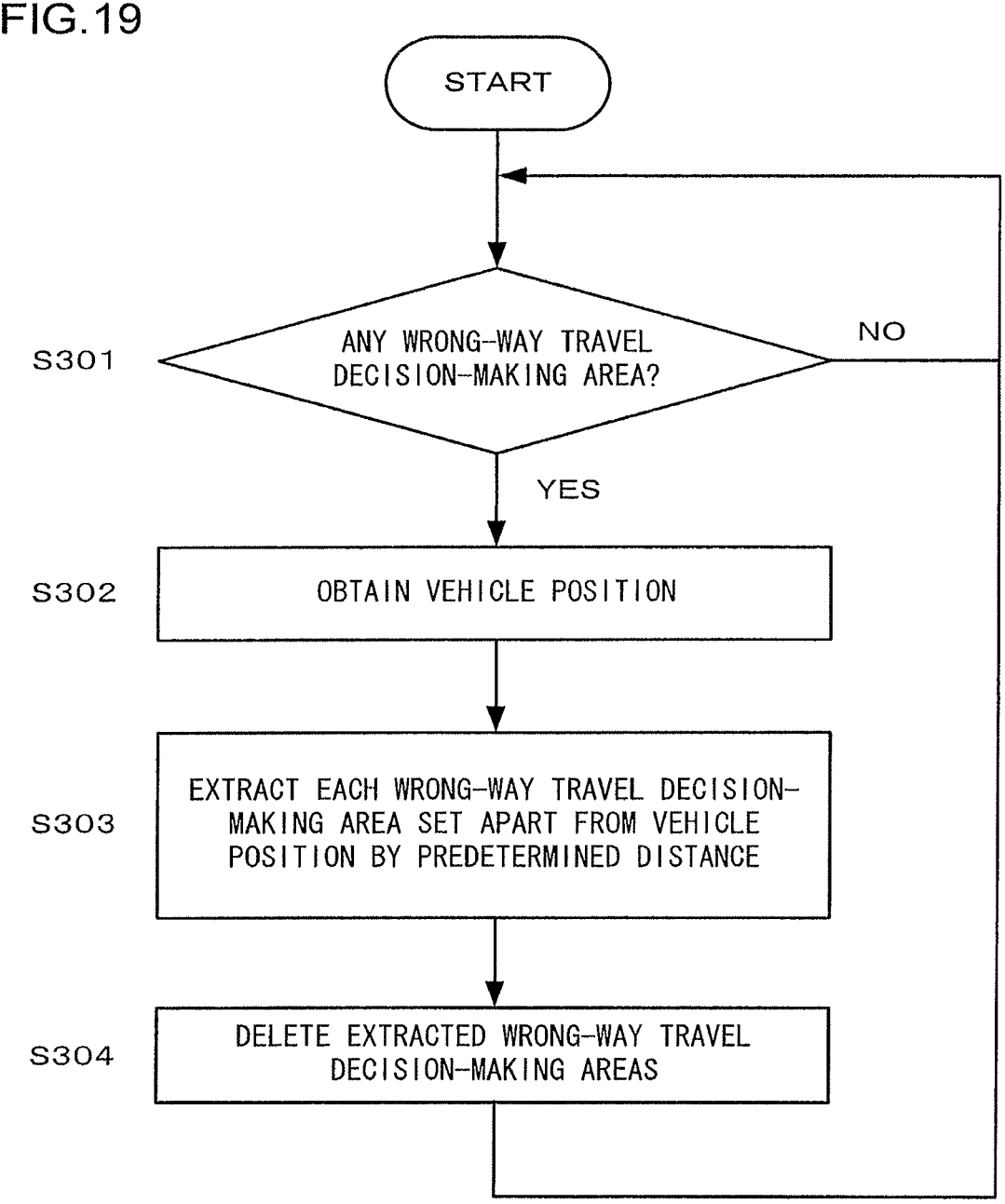

VEHICLE WRONG-WAY TRAVEL DETECTION DEVICE

CROSS-REFERENCE TO RELATED APPLICATIONS

This application is a continuation of U.S. application Ser. No. 13/634,106 which is a National Stage of International Application PCT/JP2011/055830, filed Mar. 11, 2011, which claims priority from Japanese Patent Application No. 2010-056405, filed on Mar. 12, 2010, the disclosures of which are expressly incorporated by reference herein.

TECHNICAL FIELD

The present invention relates to a vehicle wrong-way travel detection device.

BACKGROUND ART

There is a system known in the related art (patent literature 1) that compares information pertaining to the position of a subject vehicle and the subject vehicle traveling direction with information pertaining to the position of a unidirectional road and a designated direction of traffic flow on the unidirectional road and provides warning information to the driver if the vehicle is traveling against the forward flow of traffic on the unidirectional road or if the vehicle is about to enter the unidirectional road from a direction opposite the designated flow of traffic on the unidirectional road.

CITATION LIST

Patent Literature

Patent literature 1: Japanese Laid Open Patent Publication No. 2007-139531

SUMMARY OF INVENTION

Technical Problem

The system in the related art is configured so as to make a decision as to whether or not the subject vehicle is traveling on a unidirectional road by comparing the position of the subject vehicle and the position of the unidirectional road. However, the subject vehicle position information used in the system in the related art may contain an error and thus, there arises a concern that the system may issue a false warning to the driver upon determining, based upon inexact position information, that the vehicle is currently traveling on a unidirectional road if the vehicle is actually traveling on a road near the unidirectional road.

Solution to Problem

A vehicle wrong-way travel detection device according to a first aspect of the present invention includes: a subject vehicle position detection unit that detects a position of a subject vehicle; a traveling direction detection unit that detects a subject vehicle traveling direction along which the subject vehicle is traveling; a map information storage unit where map information that includes connecting point position information indicating the position of a connecting point to which a plurality of roads, including at least a unidirectional traffic road with a single direction designated for traffic flow are connected, is stored; a decision-making point setting unit that sets, based upon the map information stored in the map information storage unit, the connecting point located ahead along the subject vehicle traveling direction detected by the traveling direction detection unit as a decision-making point; a wrong-way travel decision-making area setting unit that sets wrong-way travel decision-making areas to be used to make a decision as to whether or not the subject vehicle is traveling against the traffic flow on the unidirectional traffic road, for at least one of the plurality of roads connected to the decision-making point set by the decision-making point setting unit; and a wrong-way travel decision-making unit that makes a decision, based upon the direction of traffic flow set for the unidirectional traffic road connected to the decision-making point and the subject vehicle traveling direction, as to whether or not the subject vehicle is traveling against the flow of traffic on the unidirectional traffic road. The wrong-way travel decision-making areas set by the wrong-way travel decision-making area setting unit include an immediately-effective decision-making area used to make an immediate decision as to whether or not the subject vehicle is traveling against traffic flow. When the position of the subject vehicle detected by the subject vehicle position detection unit is within a range defined by the immediately-effective decision-making area, the wrong-way travel decision-making unit makes a decision as to whether or not the subject vehicle is traveling against the flow of traffic on the unidirectional traffic road.

According to a second aspect of the present invention, in the vehicle wrong-way travel detection device of the first aspect, it is preferred that the wrong-way travel decision-making areas further include a standby decision-making area that is used to make a decision with regard to wrong-way traveling by the subject vehicle once the subject vehicle passes through the standby decision-making area, and that the wrong-way travel decision-making area setting unit sets the immediately-effective decision-making area for a unidirectional traffic road where the subject vehicle is not currently located, with the designated direction of traffic flow heading toward the decision-making point, among the plurality of roads connecting with the decision-making point, and creates the standby decision-making area for a road where the subject vehicle is currently located or for a unidirectional traffic road with the designated direction of traffic flow heading away from the decision-making point. This vehicle wrong-way travel detection device may further include an area redesignating unit that redesignates the standby decision-making area as the immediately-effective decision-making area once the subject vehicle passes through the standby decision-making area.

According to a third aspect of the present invention, in the vehicle wrong-way travel detection device of the first of second aspect, it is preferred that the wrong-way travel decision-making areas further include a decision-making end area used to end decision-making for wrong-way traveling by the subject vehicle, and that, when a road categorized as a first road type is connected to the decision-making point or when the decision-making point represents one of specific types of locations, the wrong-way travel decision-making area creation unit sets the decision-making end area for the road on which the subject vehicle is currently traveling. This vehicle wrong-way travel detection device may further include a first area deletion unit that deletes the wrong-way travel decision-making areas having been created by the wrong-way travel decision-making area creation unit once the subject vehicle passes through the decision-making end area.

According to a fourth aspect of the present invention, in the vehicle wrong-way travel detection device of the third aspect, it is preferred that the first road type includes regular roads.

According to a fifth aspect of the present invention, in the vehicle wrong-way travel detection device of the third or fourth aspect, it is preferred that the specific types of locations include toll collecting stations on toll roads.

According to a sixth aspect of the present invention, in the vehicle wrong-way travel detection device of any one of the first through fifth aspects, the wrong-way travel decision-making area setting unit may not set the wrong-way travel decision-making area on a road categorized as a second road type, among the plurality of roads connected to the decision-making point.

According to a seventh aspect of the present invention, in the vehicle wrong-way travel detection device of the sixth aspect, it is preferred that the second road type includes roads heading within toll road rest stop facilities.

According to an eighth aspect of the present invention, the vehicle wrong-way travel detection device of any one of the first through seventh aspects may further include a second area deletion unit that deletes the wrong-way travel decision-making areas present rearward along the subject vehicle traveling direction and set apart from the subject vehicle by at least a predetermined distance.

According to a ninth aspect of the present invention, the vehicle wrong-way travel detection device of any one of the first through eighth aspects may further include a warning unit that issues a warning to warn a driver through an audio message or a visual message that the subject vehicle is traveling against the flow of traffic when the wrong-way travel decision-making unit decides that the subject vehicle is traveling against the flow of traffic.

Advantageous Effect of the Invention

According to the present invention, the likelihood of making an erroneous decision that the subject vehicle is traveling against the flow of traffic is lowered and therefore, the likelihood of issuing a false warning, too, is lowered.

BRIEF DESCRIPTION OF THE DRAWINGS (FIG. 1) A block diagram showing the configuration of the vehicle wrong-way travel detection device achieved in an embodiment of the present invention (FIG. 2) An illustration presenting an example of a road area that may be created to enable decision-making pertaining to vehicle wrong-way travel (FIG. 3) An illustration presenting an example of a road area that may be created to enable decision-making pertaining to vehicle wrong-way travel (FIG. 4) An illustration presenting an example of a road area that may be created to be used to end the vehicle wrong-way travel decision-making processing (FIG. 5) An illustration for explanation of a method for creating road areas to enable decision-making pertaining to vehicle wrong-way travel in the embodiment of the present invention (FIG. 6) An illustration for explanation of a method for creating a road area to enable decision-making pertaining to vehicle wrong-way travel in the embodiment of the present invention (FIG. 7) An illustration for explanation of a method for creating a road area to enable decision-making pertaining to vehicle wrong-way travel in the embodiment of the present invention (FIG. 8) An illustration for explanation of a specific example of road areas for enabling decision-making pertaining to vehicle wrong-way travel, created in the vicinity of a toll collecting station in the embodiment of the present invention (FIG. 9) An illustration for explanation of a specific example of road areas for enabling decision-making pertaining to vehicle wrong-way travel, created in the vicinity of a toll road junction in the embodiment of the present invention (FIG. 10) An illustration of a rest-stop location such as a service area where exceptions must be made in creation road areas for enabling decision-making pertaining to vehicle wrong-way travel in the embodiment of the present invention (FIG. 11) An illustration of a rest-stop location such as a service area where exceptions must be made in creation road areas for enabling decision-making pertaining to vehicle wrong-way travel in the embodiment of the present invention (FIG. 12) An illustration of a rest-stop location such as a service area where exceptions must be made in creation road areas for enabling decision-making pertaining to vehicle wrong-way travel in the embodiment of the present invention (FIG. 13) A flowchart of an example of a processing method that may be adopted when creating road areas to enable decision-making pertaining to vehicle wrong-way travel in the embodiment of the present invention (FIG. 14) A flowchart of an example of a processing method that may be adopted when creating road areas to enable decision-making pertaining to vehicle wrong-way travel in the embodiment of the present invention (FIG. 15) A flowchart of an example of a processing method that may be adopted when making a decision pertaining to vehicle wrong-way travel in reference to road areas created through the embodiment of the present invention (FIG. 16) A flowchart of an example of a processing method that may be adopted when making a decision pertaining to vehicle wrong-way travel in reference to road areas created through the embodiment of the present invention (FIG. 17) A flowchart of an example of a processing method that may be adopted when making a decision pertaining to vehicle wrong-way travel in reference to road areas created through the embodiment of the present invention (FIG. 18) An illustration presenting an example of a method that may be adopted when deleting road areas having been created through the embodiment of the present invention (FIG. 19) A flowchart of an example of a processing method that may be adopted when deleting road areas having been created through the embodiment of the present invention

DESCRIPTION OF EMBODIMENT

Structure of Route Guidance Device

The vehicle wrong-way travel detection device according to the present invention may be adopted in a route guidance device that guides the subject vehicle to a destination set by the user through a specific traveling route by providing map information. FIG. 1 presents an example of the route guidance device achieved in an embodiment of the present invention. The following is a description of the structure of the route guidance device achieved in the embodiment of the present invention, given in reference to FIG. 1.

The route guidance device 1 in FIG. 1, achieved in the embodiment of the present invention, is installed in a vehicle and includes a GPS (global positioning system) receiver 2, a vehicle speed sensor 3, a map information database 4, an output unit 5 and a control unit 6.

The GPS receiver 2 obtains vehicle position information (the longitude and latitude) by receiving radio waves transmitted from GPS satellites and outputs the position information thus obtained to the control unit 6. The control unit 6 is able to determine through calculation the traveling direction of the vehicle based upon a change occurring over time in the vehicle position information output from the GPS receiver 2 to the control unit 6.

The vehicle speed sensor 3 obtains vehicle speed information and outputs the speed information thus obtained to the control unit 6. It is to be noted that the vehicle speed sensor 3 may be located outside the route guidance device 1. In addition, the subject vehicle speed may be detected via the GPS receiver 2 and the control unit 6 and in such a case, the route guidance device 1 does not need to include the vehicle speed sensor 3.

The map information database 4 is constituted with a storage device such as a cache memory, a main memory, an HDD (hard disk drive), a CD (compact disk), an MD (minidisk), a DVD (digital versatile disk), an optical disk or an FDD (floppy disk drive). Information required to output map information to the output unit 5 is stored in the map information database 4. For instance, node information indicating road position information or facility information such as toll collecting stations, link information indicating road connections, information pertaining to road types such as regular roads, toll roads and roads inside service areas, information indicating the speed limit and the direction of traffic flow for each road link, a route search road network database holding data correlating a condition such as the traveling distance or the average traveling time with the cost in correspondence to each node, which are used in route calculation, and the like are stored in the map information database 4. In addition, position information indicating the position of each wrong-way travel decision-making area, i.e., a road area enabling decision-making as to whether or not the subject vehicle is traveling against the flow of traffic, is also stored in correlation to the node information or the link information in the map information database 4 in the embodiment.

The output unit 5, constituted with an output device of the known art such as a CRT (cathode ray tube), a liquid crystal display device or a sound output device, outputs various types of information including map screen information and warning information in response to an instruction issued by the control unit 6.

The control unit 6 is constituted with a general-purpose information processing device or an exclusive-use information processing device, such as a microcomputer equipped with a CPU (central processing unit), a ROM (read only memory), a RAM (random access memory) and the like. The overall operations of the route guidance device 1 are controlled by the CPU executing a computer program stored in the ROM. It is to be noted that the control unit may instead be constituted with a circuit that enables execution of various types of processing by the control unit 6 through circuit operations, e.g., an ASIC (application-specific integrated circuit) or an FPGA (field-programmable gate array).

The route guidance device 1 configured as described above prevents vehicle wrong-way travel with warning information provided to the driver by concurrently executing wrong-way travel decision-making area creation processing, wrong-way travel detection processing and wrong-way travel decision-making area deletion processing, as will be described below.

The wrong-way travel warning method achieved in the embodiment of the present invention is now described in reference to an example in which the method is adopted to detect wrong-way travel on a toll road such as an express highway. A toll road such as an express highway is a one-way road on which directional restrictions on traffic flow are in effect, as indicated by the direction of traffic flow stored in the map information database 4. A vehicle is determined to be traveling against the flow of traffic on a toll road if the vehicle traveling direction differs from the designated direction of traffic flow for the particular toll road by an extent equal to or greater than a predetermined angle.

The wrong-way travel decision-making area creation processing is executed when the subject vehicle is approaching a specific node on a toll road so as to create a wrong-way travel decision-making area in conjunction with a road link extending from the particular node.

Through the wrong-way travel detection processing, wrong-way travel is detected by making a decision as to whether or not the vehicle is traveling against the flow of traffic in reference to a wrong-way travel decision-making area having been created through the wrong-way travel decision-making area creation processing and a warning, such as a sound message or a visual message, is issued to inform the driver that the vehicle is traveling against the flow of traffic.

Through the wrong-way travel decision-making area deletion processing, any redundant wrong-way travel decision-making areas, such as wrong-way travel decision-making areas located away from the subject vehicle, are deleted, so as to ensure that the load of the wrong-way travel detection processing executed by the control unit 6 does not become excessive due to numerous wrong-way travel decision-making areas having been created over time.

The following is a detailed description of the individual processing procedures.

(Wrong-Way Travel Decision-Making Area Creation Processing)

An example of wrong-way travel decision-making area creation processing that may be executed in the embodiment of the present invention is described. As the subject vehicle approaches a node such as a branching point on a toll road, a toll collecting station or a connecting point with a regular road, wrong-way travel decision-making area creation processing is executed so as to create wrong-way travel decision-making areas on road links extending from the node. A wrong-way travel decision-making area is created on a given road link at a position corresponding to wrong-way travel decision-making area position information stored in the map information database 4. It is desirable that the position indicated in the wrong-way travel decision-making area position information stored in the map information database 4 be set at a point set apart from the node by a predetermined distance or less along the particular road link. Information pertaining to the wrong-way travel decision-making area thus created is stored into the RAM or the like in the control unit 6 and is shared over the three types of processing executed by using wrong-way travel decision-making areas as described earlier.

A wrong-way travel decision-making area created in correspondence to a given road link may be an immediately-effective decision-making area, a standby decision-making area or a decision-making end area.

Figure 2:
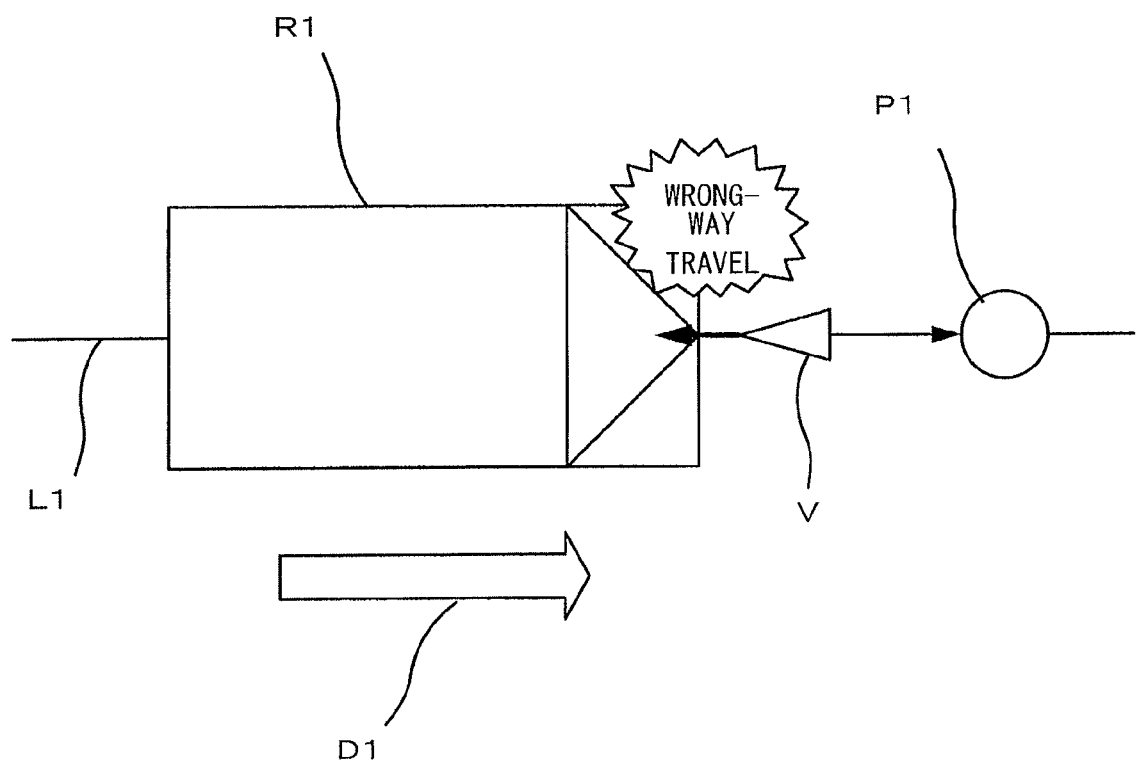

An immediately-effective decision-making area is a road area used to make a decision as to whether or not the subject vehicle is traveling against the flow of traffic by comparing the designated direction of traffic flow on the road link and the subject vehicle traveling direction. The role of the immediately-effective decision-making area is indicated in FIG. 2. FIG. 2 shows the immediately-effective decision-making area R1. The immediately-effective decision-making area R1 is set for a road link L1 heading toward a node P1. An arrow D1 indicates the designated direction of traffic flow on the road link L1. If the angle formed by the traveling direction along which the subject vehicle V is traveling within the immediately-effective decision-making area R1 and the designated direction of traffic flow D1 is equal to or greater than a predetermined angle, the subject vehicle V is determined to be traveling against the flow of traffic and a specific warning is issued. The predetermined angle may be, for instance, 135°.

Figure 3:
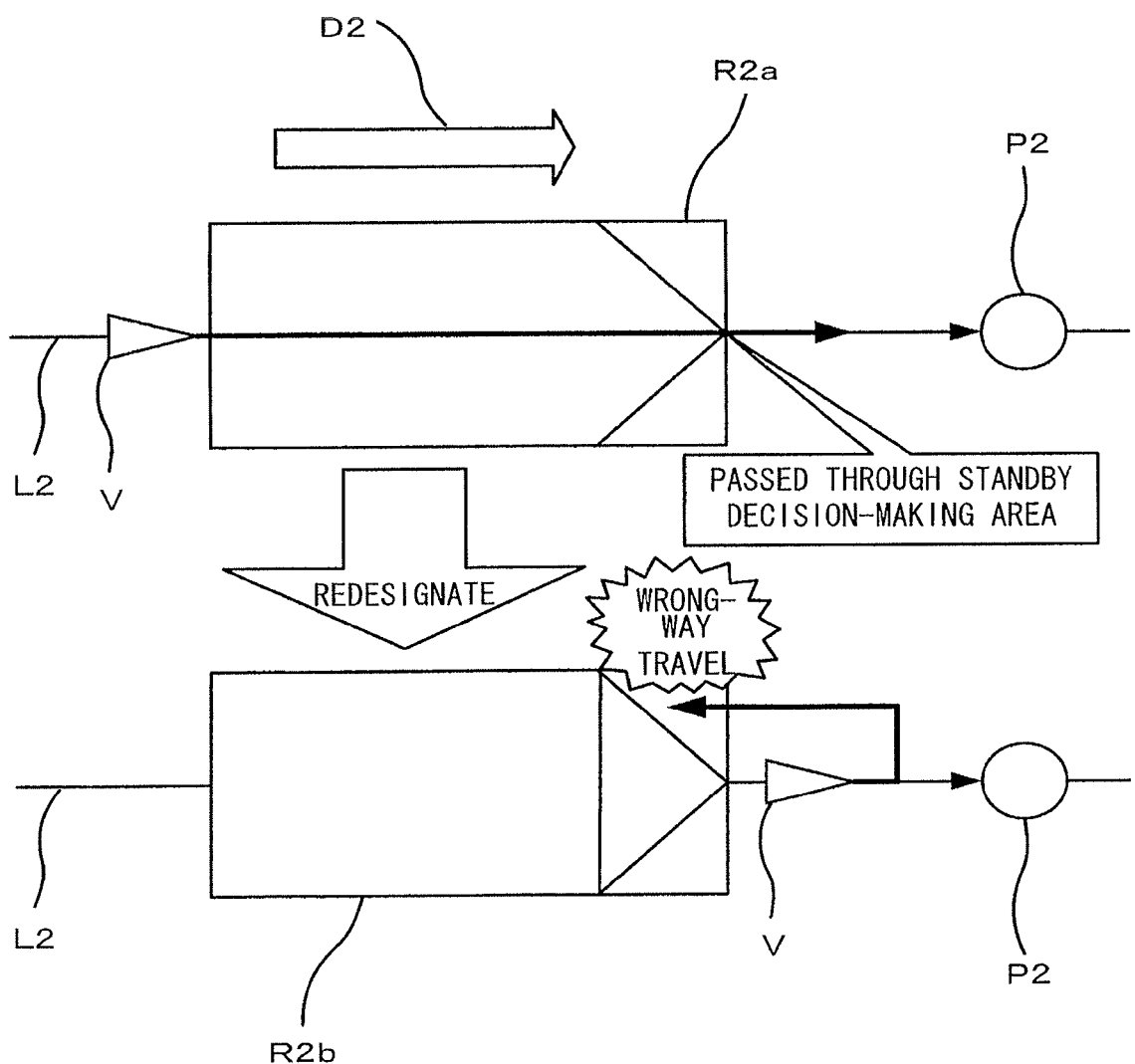

A standby decision-making area is a road area that becomes an immediately-effective decision-making area such as that described above, once the subject vehicle passes through the road area once. The role of the standby decision-making area is shown in FIG. 3. FIG. 3 shows the standby decision-making area R2a. The standby decision-making area R2a is set for a road link L2 heading toward a node P2. An arrow D2 indicates the designated direction of traffic flow on the road link L2. Once the subject vehicle V passes through the standby decision-making area R2a, the control unit 6 redesignates the standby decision-making area R2a as an immediately-effective decision-making area R2b. For instance, if the subject vehicle V makes a U-turn or the like and reenters the immediately-effective decision-making area R2b, the subject vehicle V is determined to be traveling against the flow of traffic.

Figure 4:
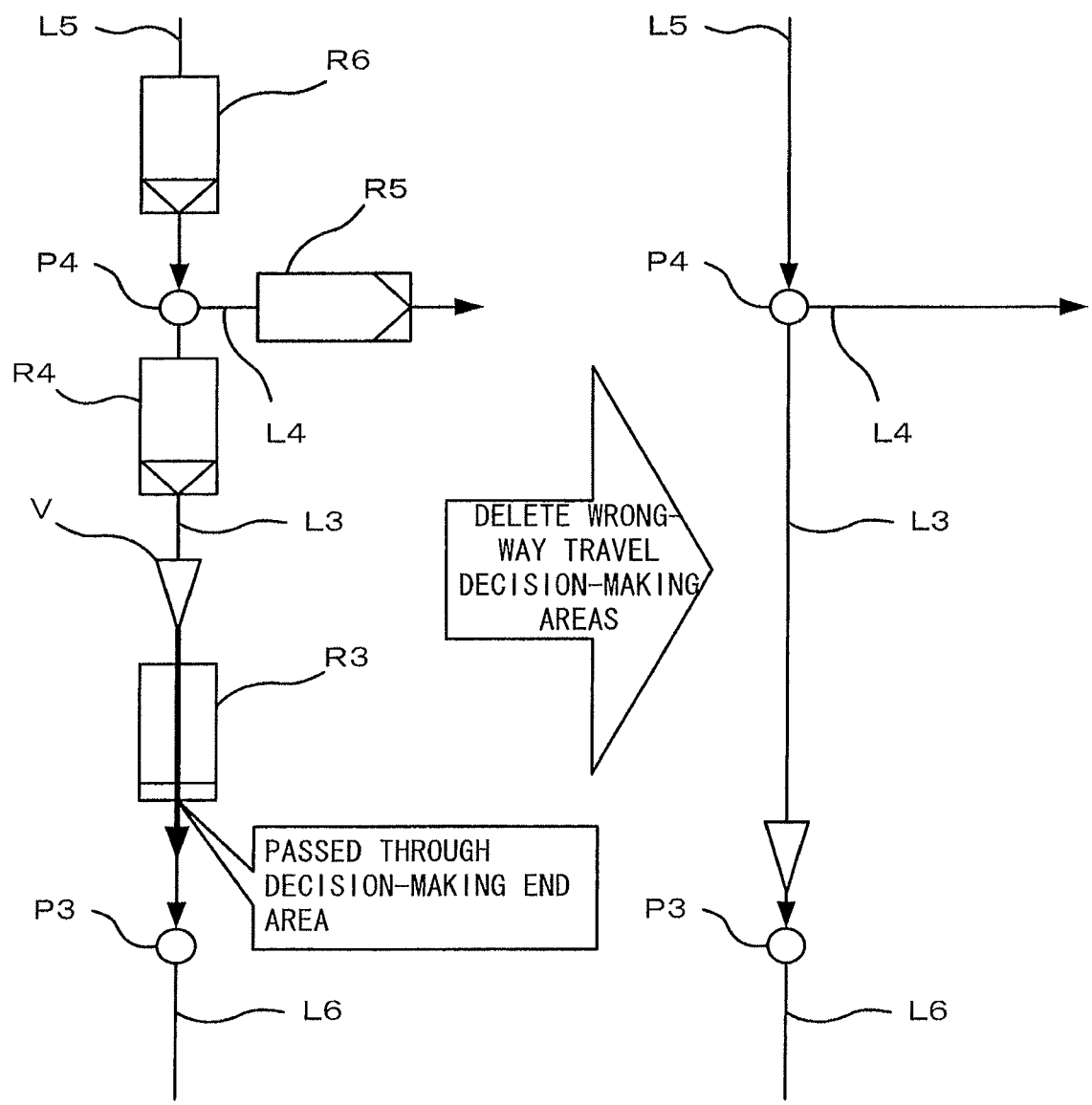

A decision-making end area is a reference road area created so that all the wrong-way travel decision-making areas having been created are categorically deleted once the subject vehicle passes through the decision-making end area. Such a decision-making end area is used when, for instance, the subject vehicle having exited a toll road has entered a regular road so as to end the toll road wrong-way travel decision-making processing by deleting the wrong-way travel decision-making areas having been created on road links along the toll road. The role of the decision-making end area is now described in reference to the example presented in FIG. 4. FIG. 4 shows the decision-making end area R3. The decision-making end area R3 is set for a road link L3 heading toward a node P3. Behind along the traveling direction of the subject vehicle V, previously created wrong-way travel decision-making areas R4 through R6, having been stored into the RAM or the like at the control unit 6, are present. Once the subject vehicle V passes through the decision-making end area R3, the wrong-way travel decision-making areas R3 through R6 are deleted.

A specific type of wrong-way travel decision-making area, among the three different types of wrong-way travel decision-making areas described above, to be created for a given road link, is determined by the control unit 6. The creation method adopted by the control unit 6 will be summarized in reference to FIGS. 5, 6 and 7.

Figure 5:
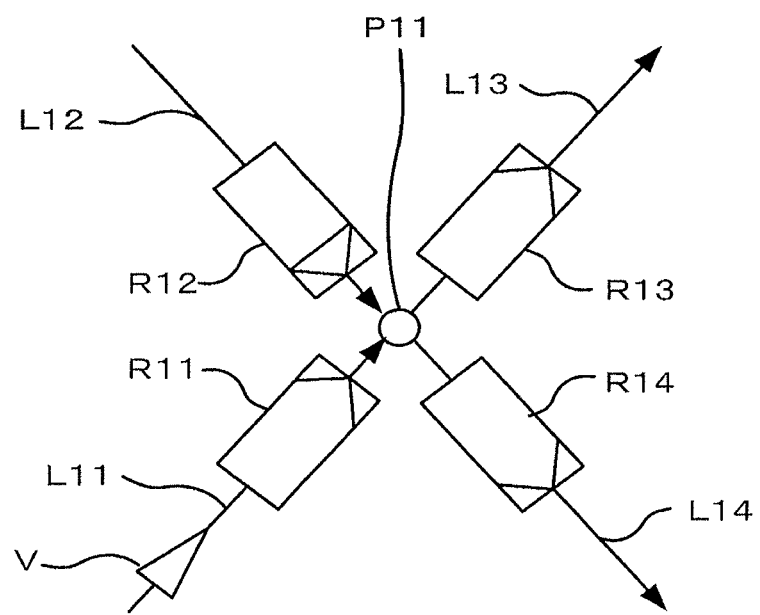

FIG. 5 illustrates the subject vehicle V traveling along a road link L11 and approaching a node P11, which is a branching point where road links L11 through L14 in a plurality of toll roads connect with one another. The road links L11 and L12 lead to the branching point P11, whereas the road links L13 and L14 lead away from the branching point P11. In the following description, the road link along which the subject vehicle is currently traveling, such as the road link L11 in this example, will be referred to as a current subject vehicle link. In addition, a road link heading toward the branching point P11, in which the subject vehicle V is not present, such as the road link L12, will be referred to as an inbound link. A road link heading away from the branching point P11, such as the road link L13 or the road link L14, will be referred to as an outbound link.

As the subject vehicle V approaches a node such as the branching point P11, the control unit 6 determines wrong-way travel decision-making areas R11 through R14 to be created on the road links L11 through L14, as shown in FIG. 5. It determines that an immediately-effective decision-making area R12 will be created on the inbound link L12. In addition, it determines that standby decision-making areas R11, R13 and R14 will be created respectively on the current subject vehicle link L11, the outbound link L13 and the outbound link L14. With the immediately-effective decision-making area R12 created on the inbound link L12, wrong-way travel by the subject vehicle V, having exited the current subject vehicle link L11 and having entered the inbound link L12 by mistake, will be detected. In addition, the standby decision-making areas R11, R13 and R14, instead of immediately-effective decision-making areas, are created for the road links L11, L13 and L14 so as to lower the risk of erroneously issuing a wrong-way travel warning for the subject vehicle V due to an error in subject vehicle traveling direction caused by an error in the position information indicating the position of the subject vehicle V.

Figure 6:
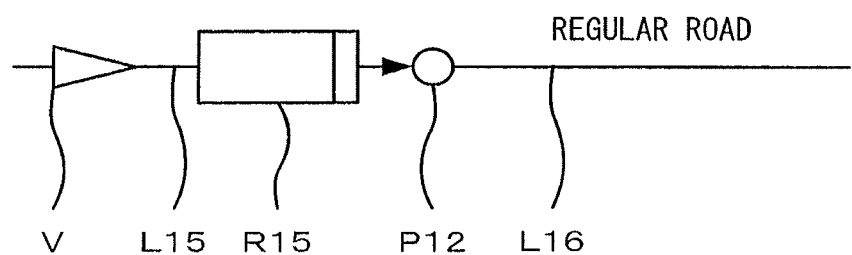

FIG. 6 illustrates the subject vehicle V traveling on a toll road link L15 and approaching a regular road connecting node P12 that connects a toll road link L15 and a regular road link L16. As the subject vehicle V approaches a node connecting with a road link in a regular road, such as the regular road connecting node P12, the control unit 6 creates a decision-making end area R15 on the current subject vehicle link L15, as shown in FIG. 6. It does not, however, create any wrong-way travel decision-making area for the regular road link L16. As a result, the control unit 6 is able to exit the toll road wrong-way travel detection once the vehicle V enters the regular road.

Figure 7:
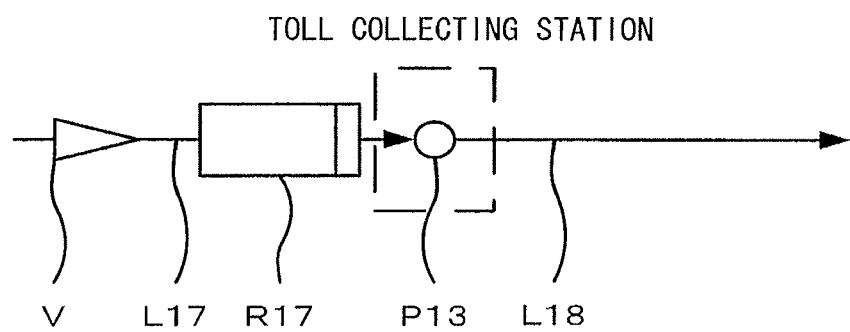

FIG. 7 shows the subject vehicle V approaching a toll collecting station node P13 at which a toll collecting station is located. A road link L17 and a road link L18, both part of a toll road, are connected to the toll collecting station node P13, and the subject vehicle V is traveling on the road link L17 toward the toll collecting station node P13.

As the subject vehicle approaches the node at which the toll collecting station is located, the control unit 6 creates a decision-making end area R17 on the current subject vehicle link L17 connecting with the toll collecting station node P13 as shown in FIG. 7. No wrong-way travel decision-making area is created for the outbound link L18 heading away from the toll collecting station node P13. It is to be noted that if a node toward which the road link L18 leads is a branching point, a wrong-way travel decision-making area corresponding to the branching point node will be created for the road link L18.

Figure 8:
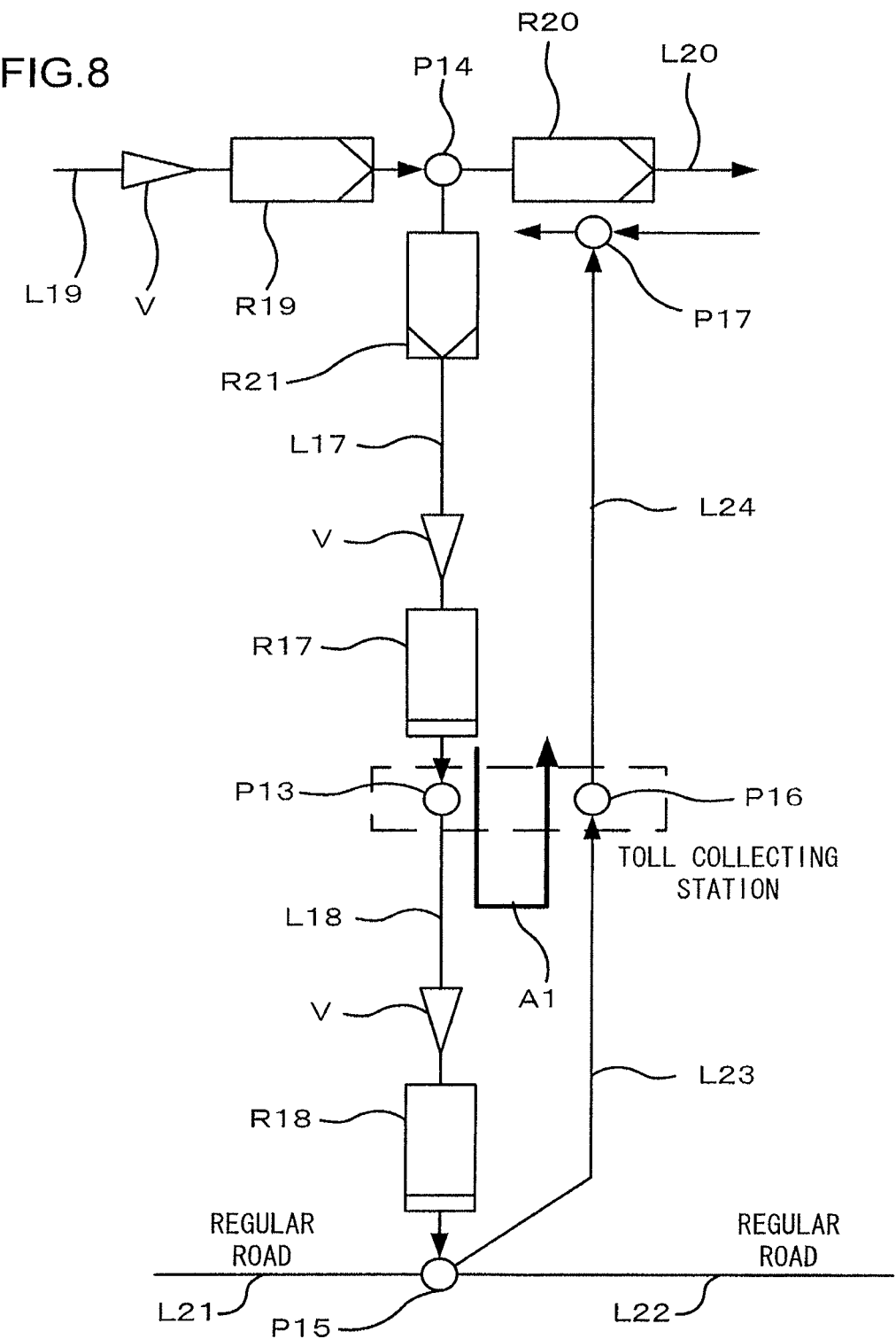

FIG. 8 illustrates how wrong-way travel decision-making areas may be created in the vicinity of a toll collecting station. In the example presented in FIG. 8, the subject vehicle V passes through a road link L19 which is part of a toll road, through a branching point P14, through a toll collecting station node P13 and then through a regular road connecting node P15 before entering a regular road.

First, as the subject vehicle V traveling on the road link L19 approaches the branching point P14, the control unit 6 creates standby decision-making areas R19, R20 and R21 respectively on the current subject vehicle link L19 heading toward the branching point P14 and outbound links L20 and L17 heading away from the branching point P14.

Once the subject vehicle V passes through the standby decision-making area R19, the standby decision-making area R19 is redesignated as an immediately-effective decision-making area. The subject vehicle V, having passed through the branching point P14 to travel on the road link L17, soon enters the standby decision-making area R21. Once the subject vehicle V passes through the standby decision-making area R21, the standby decision-making area R21 is redesignated as an immediately-effective decision-making area.

As the subject vehicle V advances on the road link L17 and approaches the toll collecting station node P13, the control unit 6 creates a decision-making end area R17 on the current subject vehicle link L17 heading toward the branching point P13, as has been explained earlier. Once the subject vehicle V passes through the decision-making end area R17, the decision-making end area R17, the immediately-effective decision-making areas R19 and R21 and the standby decision-making area R20 are all deleted.

As the subject vehicle V, having passed through the toll collecting station node P13, travels on the road link L18 and approaches the regular road connecting node P15, a decision-making end area R18 is created on the current subject vehicle link, i.e., the road link L18. Then, once the subject vehicle V passes through the decision-making end area R18, the decision-making end area R18 is deleted. The subject vehicle V passes through the regular road connecting node P15 and enters the regular road. Until the subject vehicle, currently traveling on the regular road, approaches a toll road again, the control unit 6 does not create any wrong-way travel decision-making areas. It is to be noted that if another branching point exists between the toll collecting station node P13 and the regular road connecting node P15, any wrong-way travel decision-making areas created in correspondence to this branching point will be deleted through the processing executed in conjunction with the decision-making end area R18.

The subject vehicle V having passed through the toll collecting station may drive into the opposite lane, as indicated by the arrow A1 in FIG. 8. The map data include a separate road link and a node, which are different from the road link L17 and the toll collecting station node P13, set in correspondence to the opposite lane. In the example presented in FIG. 8, a road link L24 and a node P16 are those set in correspondence to the opposite lane. As the subject vehicle V, having entered the opposite lane L24, heading along the opposite direction from the road link L17, and starts traveling along the designated flow of traffic, a false warning may be issued due to an error in the subject vehicle position information unless the previously created wrong-way travel decision-making areas (e.g., the wrong-way travel decision-making areas R19 through R21) have been deleted before the vehicle passes through the toll collecting station node P13. For instance, as the vehicle travels on the road link L24 and approaches a node P17, an error in the position information indicating the position of the subject vehicle V may cause erroneous detection with regard to the position of the subject vehicle V, incorrectly indicating that the subject vehicle V is advancing through the wrong-way travel decision-making area (immediately-effective decision-making area) R21, and in such a case, a false warning may be issued. In order to lower the risk of such a false warning, the decision-making end area R17 is created on the current subject vehicle link L17 heading toward the toll collecting station node P13.

Figure 9:
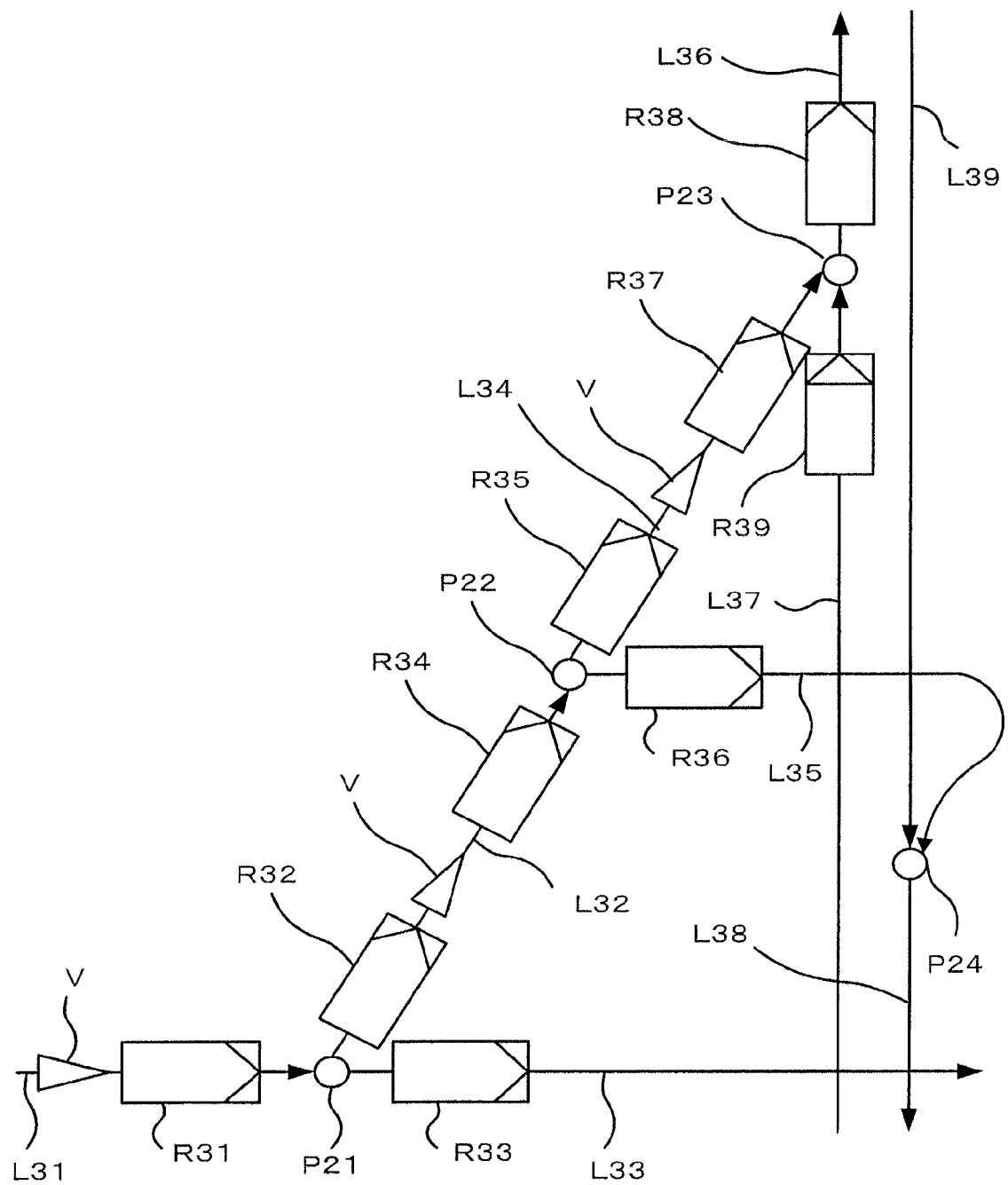

FIG. 9 shows a junction where a plurality of toll roads connect with one another. At the junction in the example presented in FIG. 9, branching point nodes P21 through P24 and road links L31 through L39 are present. The subject vehicle V, currently traveling on the road link L31, is to pass through the branching points P21, P22 and P23 to enter the road link L36.

As the subject vehicle V traveling on the road link L31 approaches the branching point P21, the control unit 6 creates wrong-way travel decision-making areas R31 through R33 respectively for the links L31 through L33 connecting with the branching point P21. The road link L31 is the current subject vehicle link. The road links L32 and L33 are outbound links heading away from the node P21. This means that the wrong-way travel decision-making areas R31 through R33 are all standby decision-making areas.

As the subject vehicle V travels along the road link L31, passes through the branching point P21 and enters the road link L32, it passes through the standby decision-making areas R31 and R32. Once the subject vehicle V passes through the standby decision-making areas R31 and R32, the control unit 6 redesignates them as immediately-effective decision-making areas.

The subject vehicle V traveling on the road link L32 approaches the branching point node P22. At this time, the control unit 6 creates wrong-way travel decision-making areas R34, R35 and R36 respectively on the road links L32, L34 and L35 connecting with the node P22. The road link L32 is the current subject vehicle link. The road links L34 and L35 are outbound links. This means that the wrong-way travel decision-making areas R34 through R36 are all standby decision-making areas.

At a location, such as a junction, where a road branches out in a complicated pattern, a plurality of branching points are often present in close proximity to one another. For instance, if the positions of the nodes P21 and P22 are close to each other, the wrong-way travel decision-making areas R32 and R34 may overlap. However, such an overlap will not cause any problem in the processing operation executed in the embodiment.

As the subject vehicle V travels along the road link L32, passes through the branching point P22 and enters the road link L34, it passes through the standby decision-making areas R34 and R35. Once the subject vehicle V passes through the standby decision-making areas R34 and R35, the control unit 6 redesignates them as immediately-effective decision-making areas.

The subject vehicle V traveling on the road link L34 approaches the branching point node P23. At this time, the control unit 6 creates wrong-way travel decision-making areas R37, R38 and R39 respectively on the road links L34, L36 and L37 connecting with the node P23. The road link L34 is the current subject vehicle link. The road link L36 is an outbound link and the road link L37 is an inbound link. This means that the wrong-weight travel decision-making areas R37 and R38 are standby decision-making areas and that the wrong-way travel decision-making area R39 is an immediately-effective decision-making area.

Next, exemption processing executed as part of the wrong-way travel decision-making area creation processing will be described. Rest stop facilities, such as service areas and parking areas, are available along toll roads. There may be restrictions imposed on the direction of traffic flow on a road heading on the periphery of a parking area in a rest stop. However, if a wrong-way travel decision-making area is created for such a road within a rest stop facility, a false wrong-way travel warning may be issued due to an error in the vehicle position while the driver of the subject vehicle is parking the vehicle in a parking lot. In order to prevent such a false warning, no wrong-way travel decision-making areas are created for road links present around a rest stop facility branching point, except for road links representing an off-ramp or an on-ramp via which vehicles enter or exit the rest stop facility.

Figure 10:
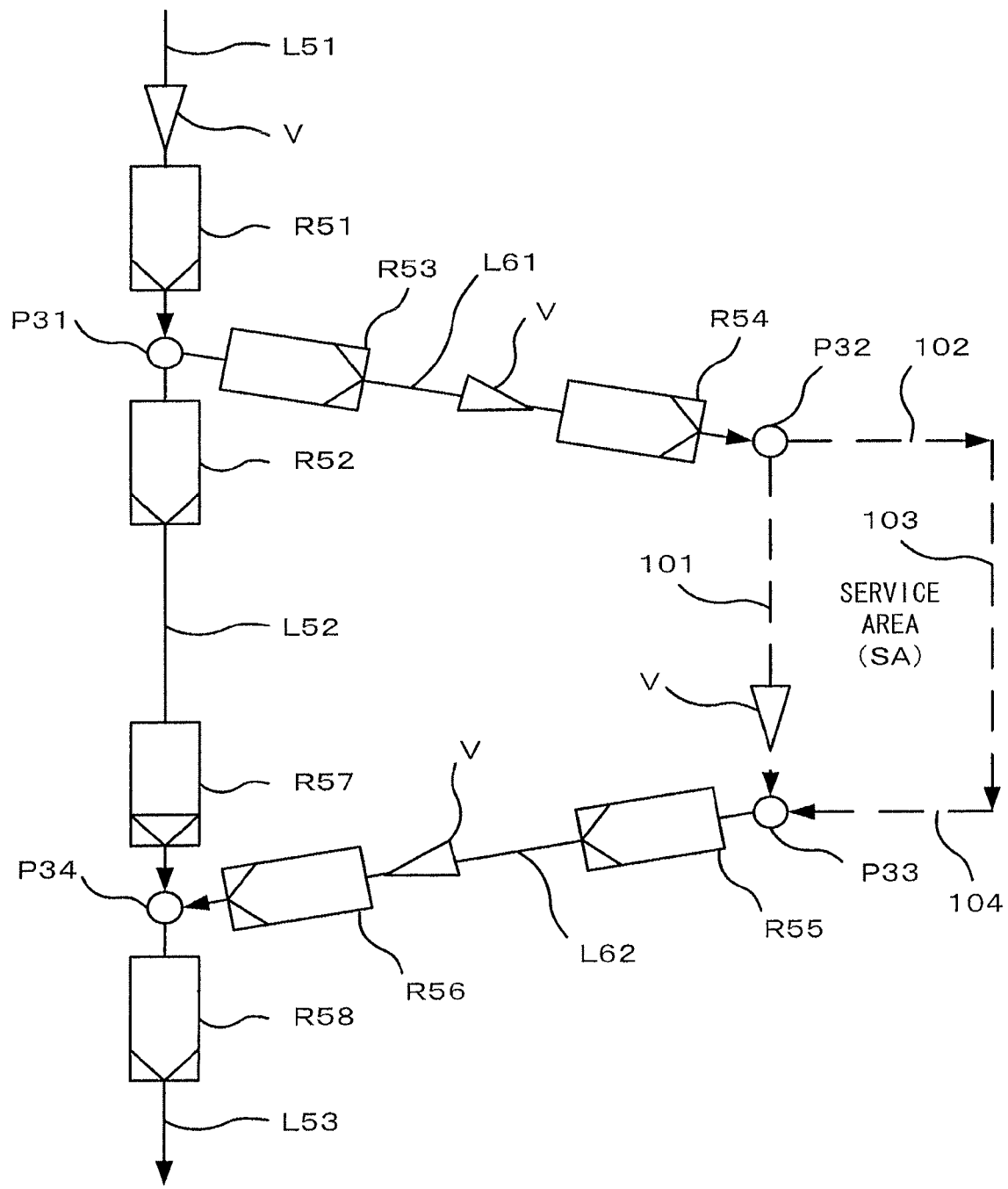
Figure 11:
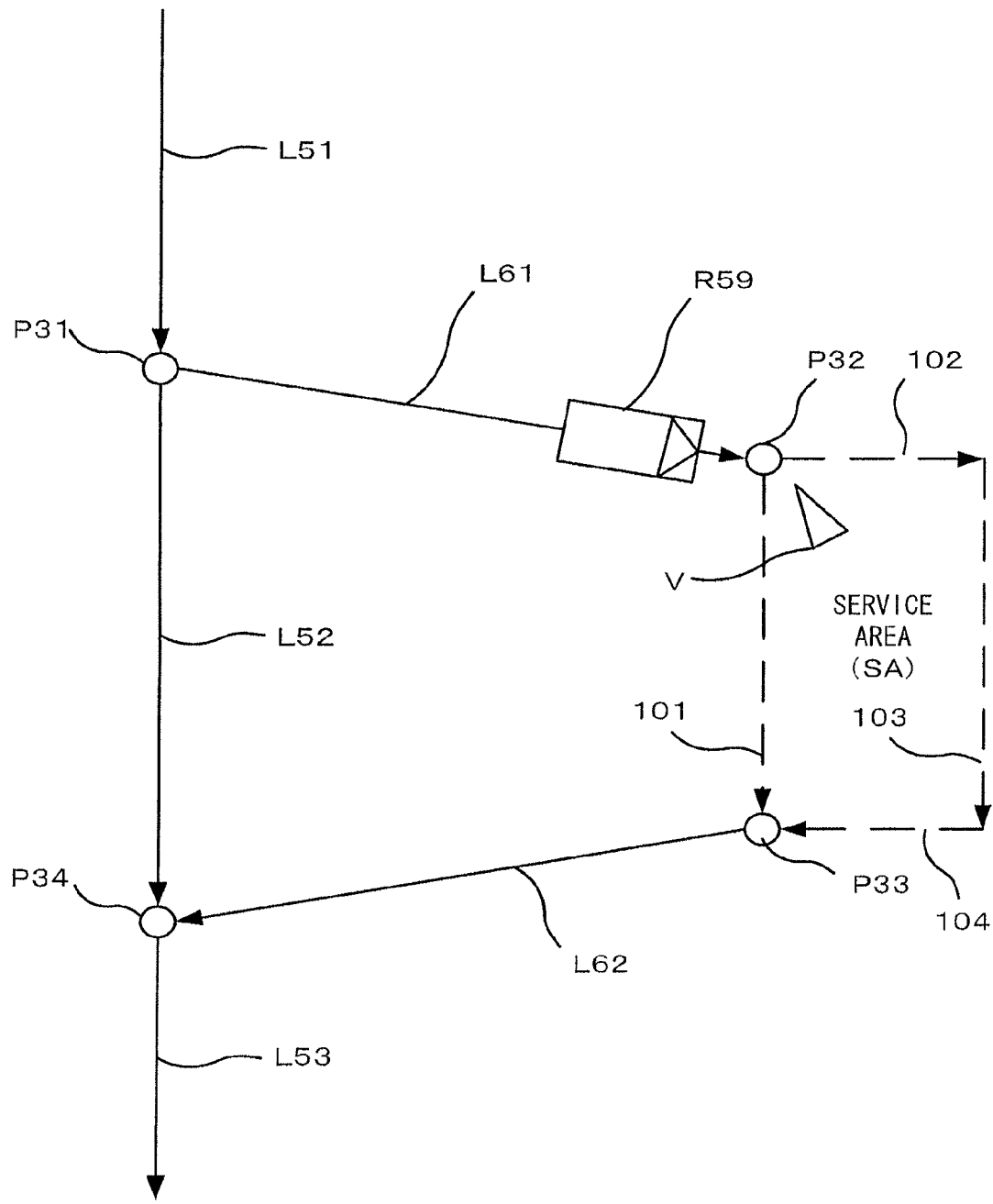
Figure 12:
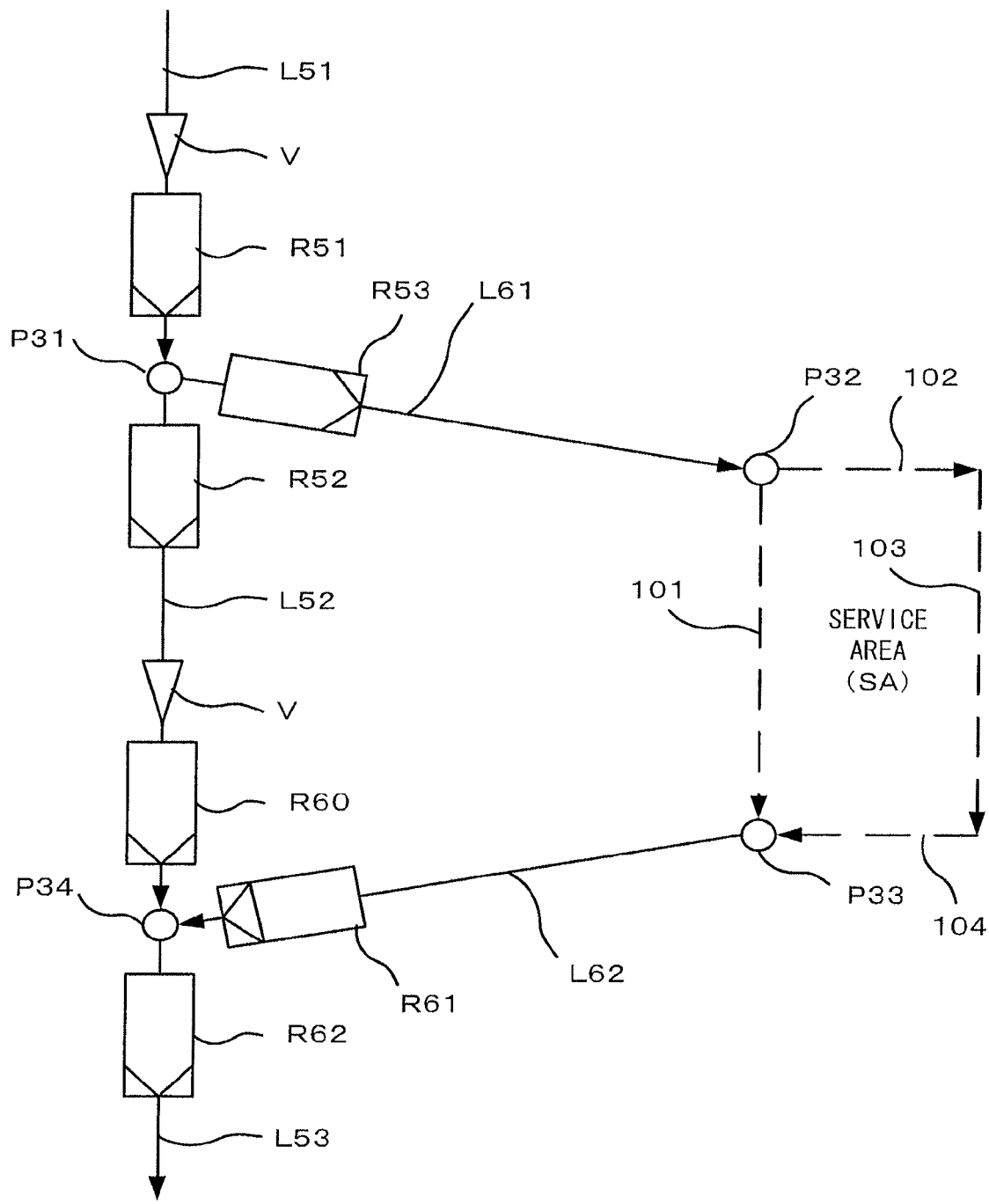

FIGS. 10 through 12 illustrate how wrong-way travel decision-making areas may be created in rest stop facilities, e.g., a service area.

Around the service area shown in FIGS. 10 through 12, four nodes P31 through P34, road links L51 through L53 on a toll road, roads 101 through 104 heading within the service area, a road link L61 representing an off-ramp via which vehicles enter the service area and a road link L62 representing an on-ramp via which vehicles exit the service area, are present.

FIG. 10 illustrates how wrong-way travel decision-making areas may be created for two different sets of circumstances, i.e., wrong-way travel decision-making areas created when the subject vehicle V, currently traveling on the road link L51, enters the service area and wrong-way travel decision-making areas created when the subject vehicle exits the service area into the road link L53.

The subject vehicle V traveling on the road link L51 approaches the branching point node P31. At this time, the control unit 6 creates wrong-way travel decision-making areas R51, R52 and R53 respectively on the road links L51, L52 and L61 connecting with branching point P31. The road link L51 is the current subject vehicle link. The road links L52 and L61 are outbound links heading away from the node P31. This means that the wrong-way travel decision-making areas R51 through R53 created in this situation are all standby decision-making areas.

As the subject vehicle V travels along the road link L51, passes through the branching point P31 and enters the road link L61, it passes through the standby decision-making areas R51 and R53. Once the subject vehicle V passes through the standby decision-making areas R51 and R53, the control unit 6 redesignates them as immediately-effective decision-making areas.

The subject vehicle V traveling on the road link L61 approaches the service area branching point, i.e., the node P32. In the following description, a node, e.g., the node P32, which connects an off-ramp with rest stop facilities such as a service area, will be referred to as a rest stop facility entry point. As the subject vehicle V approaches the rest stop facility entry point P32, the control unit 6 creates a wrong-way travel decision-making area R54 on the road link L61 connecting with the rest stop facility entry point P32. However, it does not create a wrong-way travel decision-making area for either the road 101 or the road 102 within the service area. The road link L61 is the current subject vehicle link and thus, the wrong-way travel decision-making area R54 is a standby decision-making area.

The subject vehicle V traveling through the road link L61 representing the off-ramp and the rest stop facility entry point P32 to enter the service area is bound to pass through the standby decision-making area R54. Once the subject vehicle V passes through the standby decision-making area R54, the control unit 6 redesignates the standby decision-making area 54 as an immediately-effective decision-making area.

The subject vehicle V on its way out of the service area approaches the node P33 connecting the service area and the road link L62 representing the on-ramp via which the vehicle exits the service area. In the following description, a node, e.g., the node P33, which connects service stop facilities such as a service area with an on-ramp, will be referred to as a rest stop facility exit point. As the subject vehicle V approaches the rest stop facility exit point P33, the control unit 6 creates a wrong-way travel decision-making area R55 on the road link L62 representing the on-ramp. While the road 101 and the road 104 within the service area are connected with the rest stop facility exit point P33, no wrong-way travel decision-making areas are created in correspondence to these roads. Since the road link L62 representing the on-ramp is an outbound link heading away from the rest stop facility exit point P33, the wrong-way travel decision-making area R55 is a standby decision-making area.

Once the subject vehicle V, having entered the road link L62 from the service area, passes through the standby decision-making area R55, the control unit 6 redesignates the standby decision-making area R55 as an immediately-effective decision-making area.

The subject vehicle V traveling on the road link L62 representing the on-ramp approaches the branching point node P34. As the subject vehicle V approaches the branching point P34, the control unit 6 creates wrong-way travel decision-making areas R56, R57 and R58 respectively on the road links L62, L52 and L53 connecting with branching point P34. The road link L62 representing the on-ramp is the current subject vehicle link. The road link L52 is an inbound link heading toward the node P34. The road link L53 is an outbound link heading away from the node P34. Accordingly, the wrong-way travel decision-making area R57 is an immediately-effective decision-making area and the wrong-way travel decision-making areas R56 and R58 are standby decision-making areas.

As the subject vehicle V travels along the road link L62 representing the on-ramp, passes the branching point P34 and enters the road link L53, the subject vehicle V passes through the standby decision-making areas R56 and R58. Once the subject vehicle V passes through the standby decision-making areas R56 and R58, the control unit 6 redesignates these decision-making areas as immediately-effective decision-making areas.

FIG. 11 shows the subject vehicle V, currently located within the service area, approaching the rest stop facility entry point P32. In this situation, an immediately-effective decision-making area R59 is created at the road link L61 representing the off-ramp, which is an inbound link heading toward the rest stop facility entry point P32. As a result, if the subject vehicle V travels the off-ramp against the flow of traffic, it will be detected.

FIG. 12 shows the subject vehicle V traveling on the road link L51, passing the branching point P31 and entering the road link L52. Once the subject vehicle V, having entered the road link L52, passes through the standby decision-making area R52, the control unit 6 redesignates the standby decision-making area R52 as an immediately-effective decision-making area. Then, as the subject vehicle approaches the branching point P34, the control unit 6 creates wrong-way travel decision-making areas R60 through R62 as shown in FIG. 12. In this situation, the road link L52 is the current subject vehicle link, i.e., it is not an inbound link, and thus, the wrong-way travel decision-making area R60 is a standby decision-making area. In addition, since the road link L62 representing the on-ramp is an inbound link heading toward the branching point P34, the wrong-way travel decision-making area R56 is an immediately-effective decision-making area.

Figure 13:
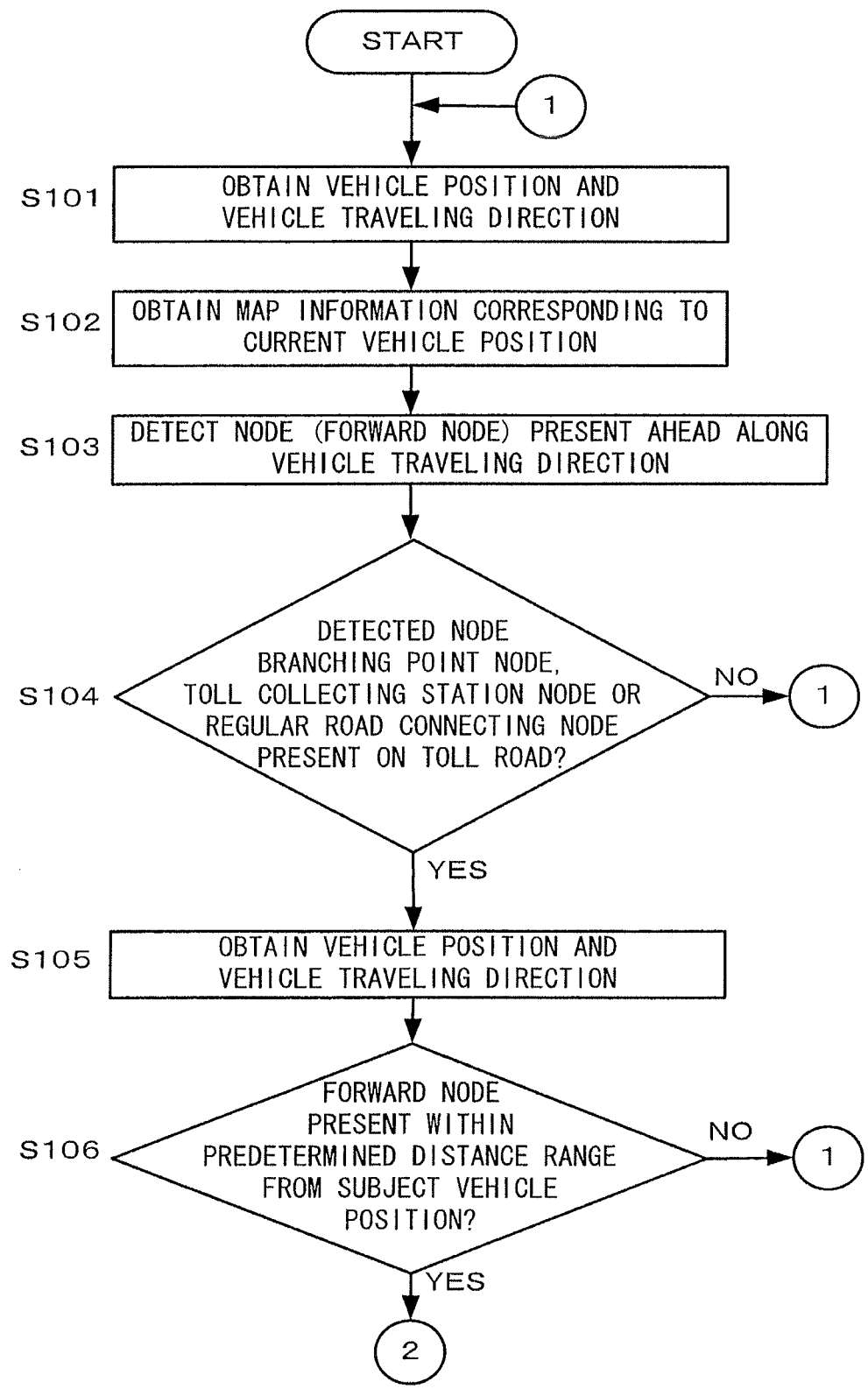
Figure 14:
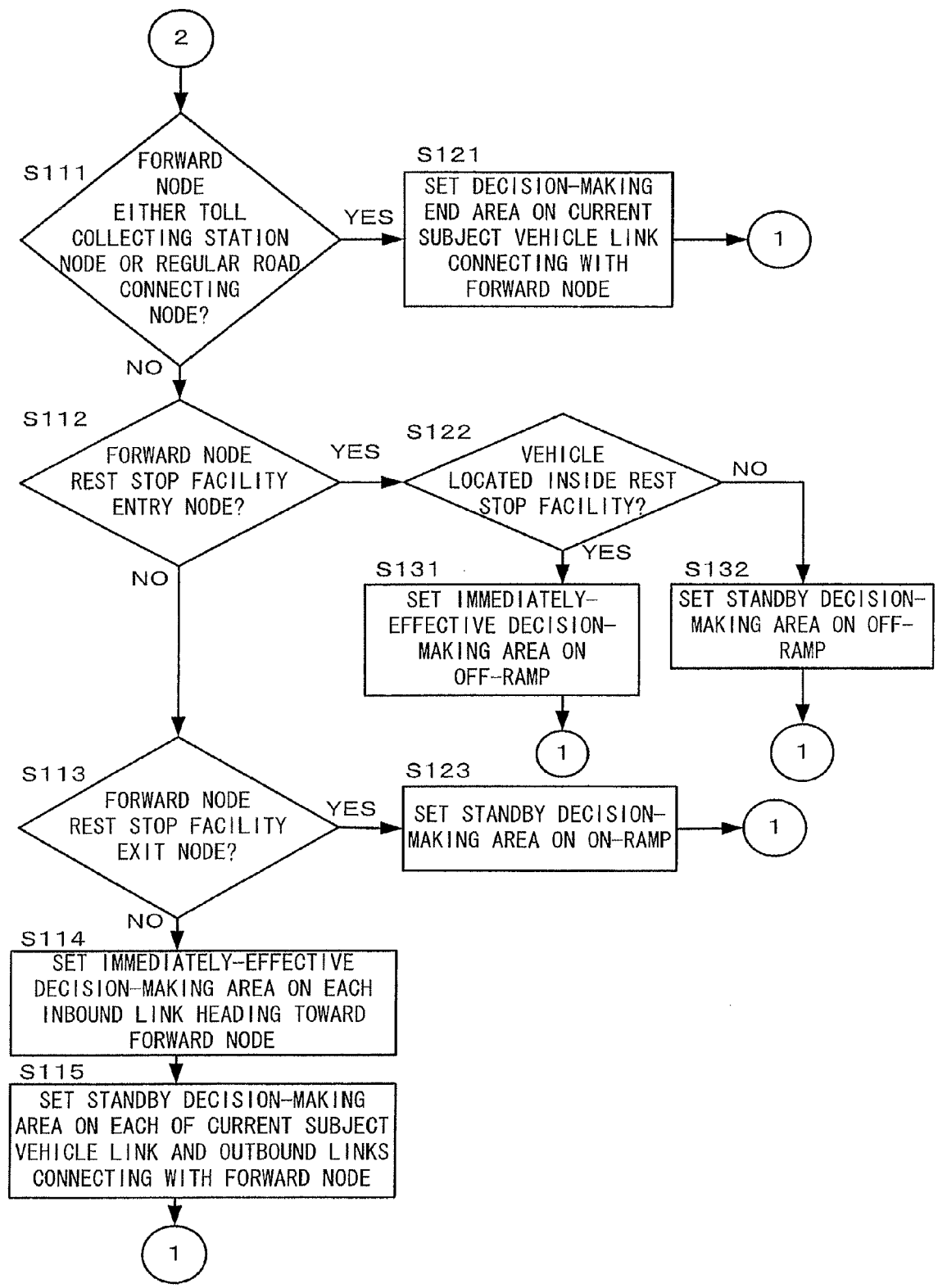

FIG. 13 and FIG. 14 present a flowchart of the wrong-way travel decision-making area creation processing described above. The processing shown in the flowchart presented in FIGS. 13 and 14, started as power to the route guidance device 1 is turned on, is executed by the control unit 6.

In step S101, the control unit 6 obtains vehicle position information and vehicle traveling direction information via the GPS receiver 2. Once the information is obtained, the processing in step S101 is completed and the operation proceeds to step S102.

In step S102, the control unit 6 obtains map information for an area around the current vehicle position from the map information database 4 based upon the vehicle position information obtained through the processing in step S101. Once the map information is obtained, the processing in step S102 is completed and the operation proceeds to step S103.

In step S103, the control unit 6 detects the node (hereafter referred to as a forward node) to be passed through next as the vehicle advances forward along the traveling direction, based upon the vehicle position information and the vehicle traveling direction information having been obtained through the processing in step S101 and the information available in the information map database 4. Once the forward node is detected, the processing in step S103 is completed and the operation proceeds to step S104.

In step S104, the control unit 6 makes a decision, based upon the road type information, the node information, the link information and the like stored in the map information database 4, as to whether or not the node, having been detected in step S103 is a toll road branching point node, a toll collecting station node or a regular road connecting node. If it is decided that the forward node is a toll road branching point node, a toll collecting station node or a regular road connecting node, the operation proceeds to step S105. Otherwise, the operation returns to step S101.

In step S105, the control unit 6 obtains vehicle position information and vehicle traveling direction information, as in step S101. Once the information is obtained, the processing in step S105 is completed and the operation proceeds to step S106.

In step S106, the control unit 6 makes a decision, based upon the node information stored in the map information database 4 and the vehicle position information obtained in step S105, as to whether or not the forward node is present within a predetermined distance range from the subject vehicle position. If the forward node is determined to be present within the predetermined distance range, the operation proceeds to step S111 in FIG. 14 on the assumption that the vehicle has come close to the forward node.

In step S111 in FIG. 14, the control unit 6 makes a decision, based upon the node information, the link information and the road type information stored in the map information database 4, as to whether or not the forward node is a toll collecting station node or a regular road connecting node. If the forward node is determined to be either a toll collecting station node or a regular road connecting node, the operation proceeds to step S121. However, if the forward node is determined to be neither a toll collecting station node nor a regular road connecting node, the operation proceeds to step S112.

In step S121, the control unit 6 identifies the current subject vehicle link based upon the vehicle position information obtained in step S105 in FIG. 13 and the link information stored in the map information database 4. Then, the control unit 6 sets a decision-making end area on the current subject vehicle link connecting to the forward node, as shown in FIG. 6 or FIG. 7, based upon the wrong-way travel decision-making area position information stored in the map information database 4. The operation then returns to step S101 in FIG. 13.

In step S112, the control unit 6 makes a decision, based upon the node information, the link information and the road type information stored in the map information database 4, as to whether or not the forward node is a rest stop facility entry node. If it is decided that the forward node is a rest stop facility entry node, the operation proceeds to step S122. If it is decided that the forward node is not a rest stop facility entry node, the operation proceeds to step S113.

In step S122, the control unit 6 makes a decision, based upon the subject vehicle position information obtained in step S105 in FIG. 13, as to whether or not the subject vehicle is currently located within a rest stop facility. If it is decided that the subject vehicle is currently located within a rest stop facility, the operation proceeds to step S131. However, if it is decided that the subject vehicle position is located outside a rest stop facility (i.e., if it is decided that the subject vehicle is currently on an off-ramp), the operation proceeds to step S132.

In step S131, the control unit 6 identifies the off-ramp road link, i.e., an inbound link heading toward the rest stop facility entry node, based upon the road type information stored in the map information database 4. The control unit 6 then sets an immediately-effective decision-making area such as the wrong-way travel decision-making area R59 in FIG. 11, for the off-ramp road link based upon the wrong-way travel decision-making area position information stored in the map information database 4. Once the immediately-effective decision-making area is set, the processing in step S131 is completed and the operation returns to step S101 in FIG. 13.

In step S132, the control unit 6 identifies the off-ramp road link, i.e., an inbound link heading toward the rest stop facility entry node, based upon the road type information stored in the map information database 4. The control unit 6 then sets a standby decision-making area, such as the wrong-way travel decision-making area R54 in FIG. 10, for the off-ramp road link based upon the wrong-way travel decision-making area position information stored in the map information database 4. Once the standby decision-making area is set, the processing in step S132 is completed and the operation returns to step S101 in FIG. 13.

In step S113, the control unit 6 makes a decision, based upon the node information, the link information and the road type information stored in the map information database 4, as to whether or not the forward node is a rest stop facility exit node. If it is decided that the forward node is a rest stop facility exit node, the operation proceeds to step S123. If it is decided that the forward node is not a rest stop facility exit node, the operation proceeds to step S114.

In step S123, the control unit 6 identifies the road link representing an on-ramp connecting with the rest stop facility exit node based upon the road type information stored in the map information database 4. The control unit 6 then sets a standby decision-making area such as the wrong-way travel decision-making area R55 in FIG. 10, for the on-ramp road link based upon the wrong-way travel decision-making area position information stored in the map information database 4. Once the standby decision-making area is set, the processing in step S123 is completed and the operation returns to step S101 in FIG. 13.

In step S114, since the forward node is a toll road branching point, the control unit 6 identifies each inbound link heading toward the forward node based upon the vehicle position information obtained in step S105 in FIG. 13 and the link information stored in the map information database 4. The control unit 6 then sets an immediately-effective decision-making area, such as the wrong-way travel decision-making area R12 in FIG. 5, in correspondence to each inbound link heading toward the forward node based upon the wrong-way travel decision-making area position information stored in the map information database 4. Once the immediately-effective decision-making area is set, the processing in step S114 is completed and the operation proceeds to step S115.

In step S115, the control unit 6 identifies the current subject vehicle link connecting with the forward node and each outbound link heading away from the forward node based upon the vehicle position information obtained in step S105 in FIG. 13 and the link information stored in the map information database 4. The control unit 6 then sets standby decision-making areas, such as the wrong-way travel decision-making areas R11, R13 and R14 in FIG. 5, in correspondence to the current subject vehicle link connecting to the forward node and each of the outbound links heading away from the forward node based upon the wrong-way travel decision-making area position information stored in the map information database 4. Once the standby decision-making areas are set, the processing in step S115 is completed and the operation returns to step S101 in FIG. 13.

Through the processing executed as has been described in reference to the flowchart, optimal wrong-way travel decision-making areas are created for the subject vehicle traveling on a toll road.

(Wrong-Way Travel Detection Processing)

Next, an example of wrong-way travel detection processing that may be executed in the embodiment of the present invention is described. The wrong-way travel detection processing in the embodiment is executed by the control unit 6. The wrong-way travel detection processing in the embodiment is executed, as has been described in reference to FIGS. 2 through 4, when the subject vehicle is present within a road area defined by a wrong-way travel decision-making area having been created through the wrong-way travel decision-making area creation processing.

The wrong-way travel detection processing will now be described in reference to the flowchart presented in FIGS. 15 through 17. The processing shown in the flowchart presented in FIGS. 15 through 17, started as power to the route guidance device 1 is turned on, is executed by the control unit 6. It is to be noted that the wrong-way travel detection processing is executed concurrently while the wrong-way travel decision-making area creation processing is in progress, as has been explained earlier.

Upon starting execution of the wrong-way travel detection processing, the control unit 6 starts executing the processing in step S201. In step S201, the control unit 6 obtains vehicle position information and vehicle traveling direction information via the GPS receiver 2. Once the information is obtained, the processing in step S201 is completed and the operation proceeds to step S202.

In step S202, the control unit 6 makes a decision, based upon the vehicle position information obtained in step S201 and the information pertaining to wrong-way travel decision-making areas, stored in the RAM or the like in the control unit 6, as to whether or not the subject vehicle is currently located within a decision-making end area. If it is decided that the subject vehicle is currently located within a decision-making end area, the operation proceeds to step S203 in order to start the processing explained in reference to FIG. 4. However, if it is decided that the subject vehicle is not located within a decision-making end area, the operation proceeds to step S211 in FIG. 16.

In step S203, the control unit 6 obtains vehicle position information and vehicle traveling direction information via the GPS receiver 2, as in step S201. Once the information is obtained, the processing in step S203 is completed and the operation proceeds to step S204.

In step S204, the control unit 6 makes a decision, based upon the subject vehicle position information and the subject vehicle traveling direction information obtained in step S203, as to whether or not the subject vehicle has passed through the decision-making end area. If the control unit 6 decides that the subject vehicle has not passed through the decision-making end area yet, the operation returns to step S203, whereas if the control unit 6 decides that the subject vehicle has passed through the decision-making end area, the operation proceeds to step S205.

In step S205, the control unit 6 deletes all the wrong-way travel decision-making areas created through the wrong-way travel decision-making area creation processing, before the operation returns to step S201.

Figure 15:
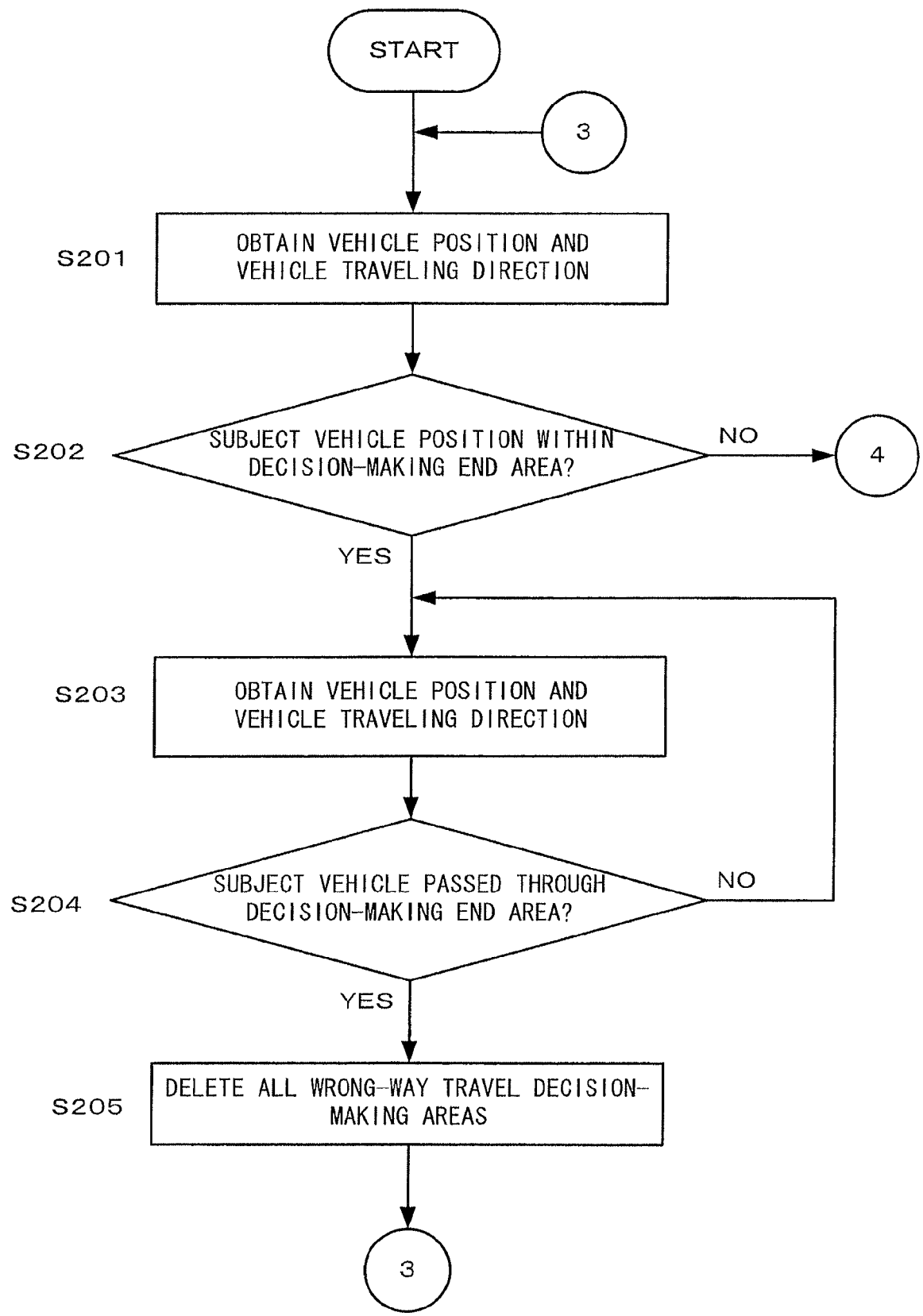
Figure 16:
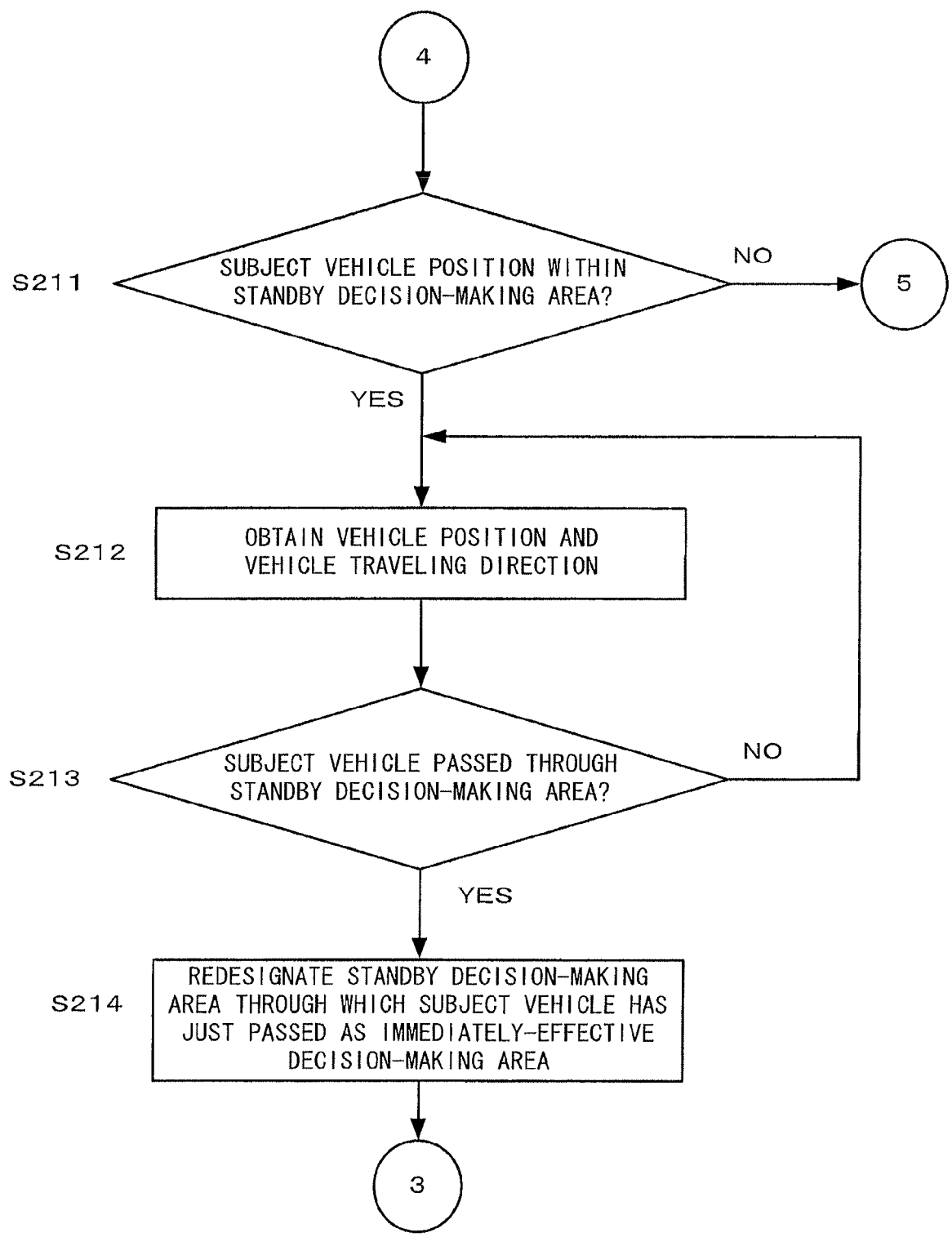

In step S211 in FIG. 16, the control unit 6 makes a decision, based upon the vehicle position information obtained in step S201 in FIG. 15 and the wrong-way travel decision-making area information stored in the RAM or the like in the control unit 6, as to whether or not the subject vehicle is currently located within a standby decision-making area. If it is decided that the subject vehicle is currently located within a standby decision-making area, the operation proceeds to step S212 so as to start the processing described in reference to FIG. 3. However, if it is decided that the subject vehicle is not located within a standby decision-making area, the operation proceeds to step S221 in FIG. 17.

In step S212, the control unit 6 obtains vehicle position information and vehicle traveling direction information via the GPS receiver 2, as in step S201. Once the information is obtained, the processing in step S212 is completed and the operation proceeds to step S213.

In step S213, the control unit 6 makes a decision, based upon the subject vehicle position information and the subject vehicle traveling direction information obtained in step S212, as to whether or not the subject vehicle has passed through the standby decision-making area. If the control unit 6 decides that the subject vehicle has not passed through the standby decision-making area yet, the operation returns to step S212, whereas if the control unit 6 decides that the subject vehicle has passed through the standby decision-making area, the operation proceeds to step S214.

In step S214, the control unit 6 redesignates the standby decision-making area, through which the subject vehicle has just passed, as an immediately-effective decision-making area, and then the operation returns to step S201 in FIG. 15.

Figure 17:
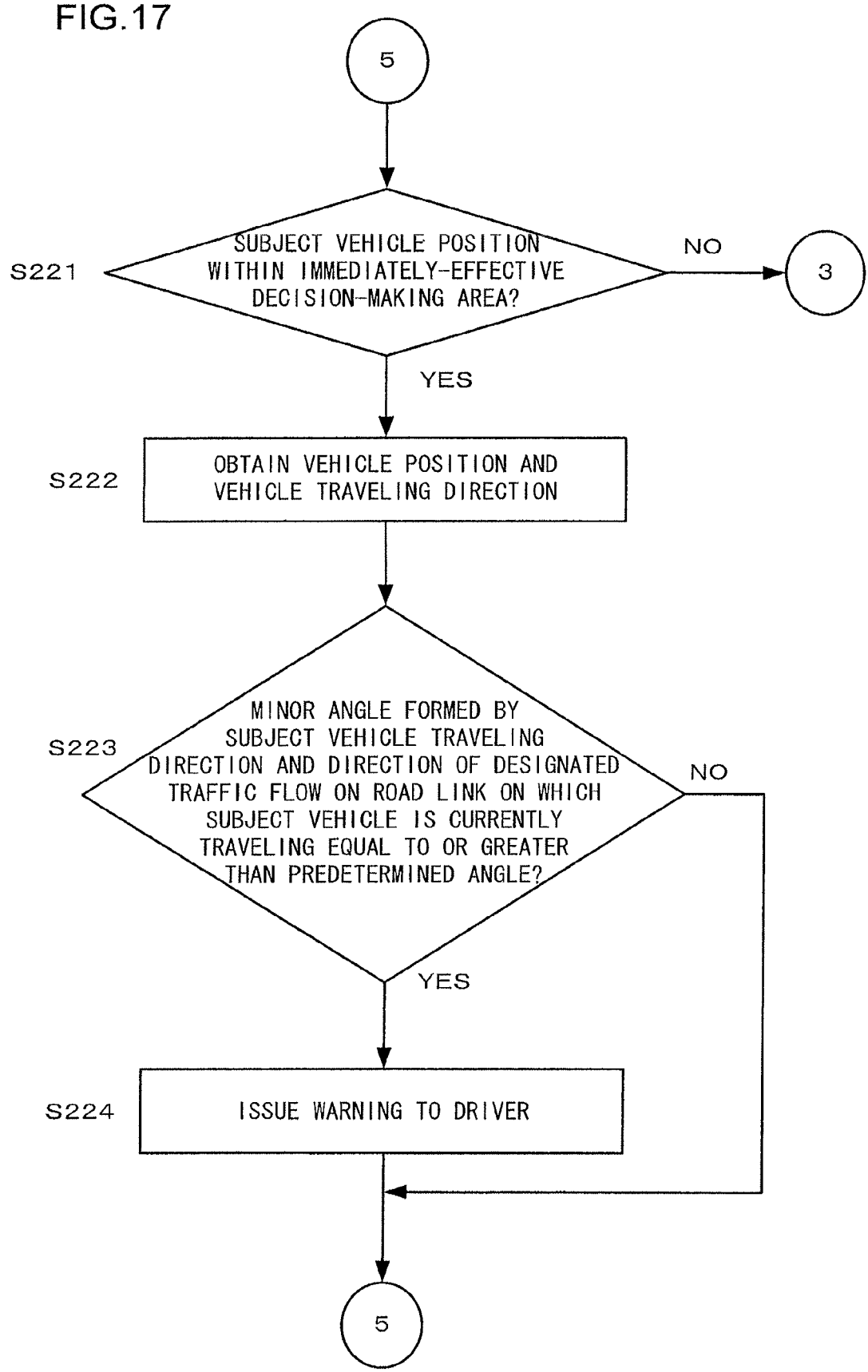

In step S221 in FIG. 17, the control unit 6 makes a decision, based upon the subject vehicle position information obtained in step S201 in FIG. 15 and the wrong-way travel decision-making area information stored in the RAM or the like in the control unit 6, as to whether or not the subject vehicle is currently located within a immediately-effective decision-making area. If it is decided that the subject vehicle is currently located within an immediately-effective decision-making area, the operation proceeds to step S222 so as to start the processing described in reference to FIG. 2. However, if it is decided that the subject vehicle is not located within an immediately-effective decision-making area, the operation returns to step S201 in FIG. 15 on the assumption that the vehicle is not located within a wrong-way travel decision-making area.

In step S222, the control unit 6 obtains vehicle position information and vehicle traveling direction information via the GPS receiver 2, as in step S201. Once the information is obtained, the processing in step S222 is completed and the operation proceeds to step S223.

In step S223, the control unit 6 calculates the minor angle formed by the vehicle traveling direction indicated in the information obtained in step S222 and the designated direction of traffic flow on the road link for which the immediately-effective decision-making area has been created and makes a decision as to whether or not the minor angle is equal to or greater than a predetermined angle. If it is decided that the minor angle formed by the two directions is equal to or greater than the predetermined angle, the operation proceeds to step S224. If, on the other hand, it is decided that the minor angle formed by the two directions is less than the predetermined angle, the operation returns to step S221 to make a decision as to whether or not the subject vehicle is still traveling within the immediately-effective decision-making area.

In step S224, the control unit 6 issues a warning to the driver that the subject vehicle is traveling against the flow of traffic on the road link by outputting an visual message or a sound message via the output unit 5, before the operation returns to step S221.

(Wrong-Way Travel Decision-Making Area Deletion Processing)

Next, an example of wrong-way travel decision-making area deletion processing that may be executed in the embodiment of the present invention is described.

In the wrong-way travel decision-making area deletion processing, any wrong-way travel decision-making area that is located a significant distance from the current subject vehicle position, among the wrong-way travel decision-making areas created through the wrong-way travel decision-making area creation processing, is deleted. The operation executed through the wrong-way travel decision-making area deletion processing will now be described in reference to FIG. 18.

Figure 18:
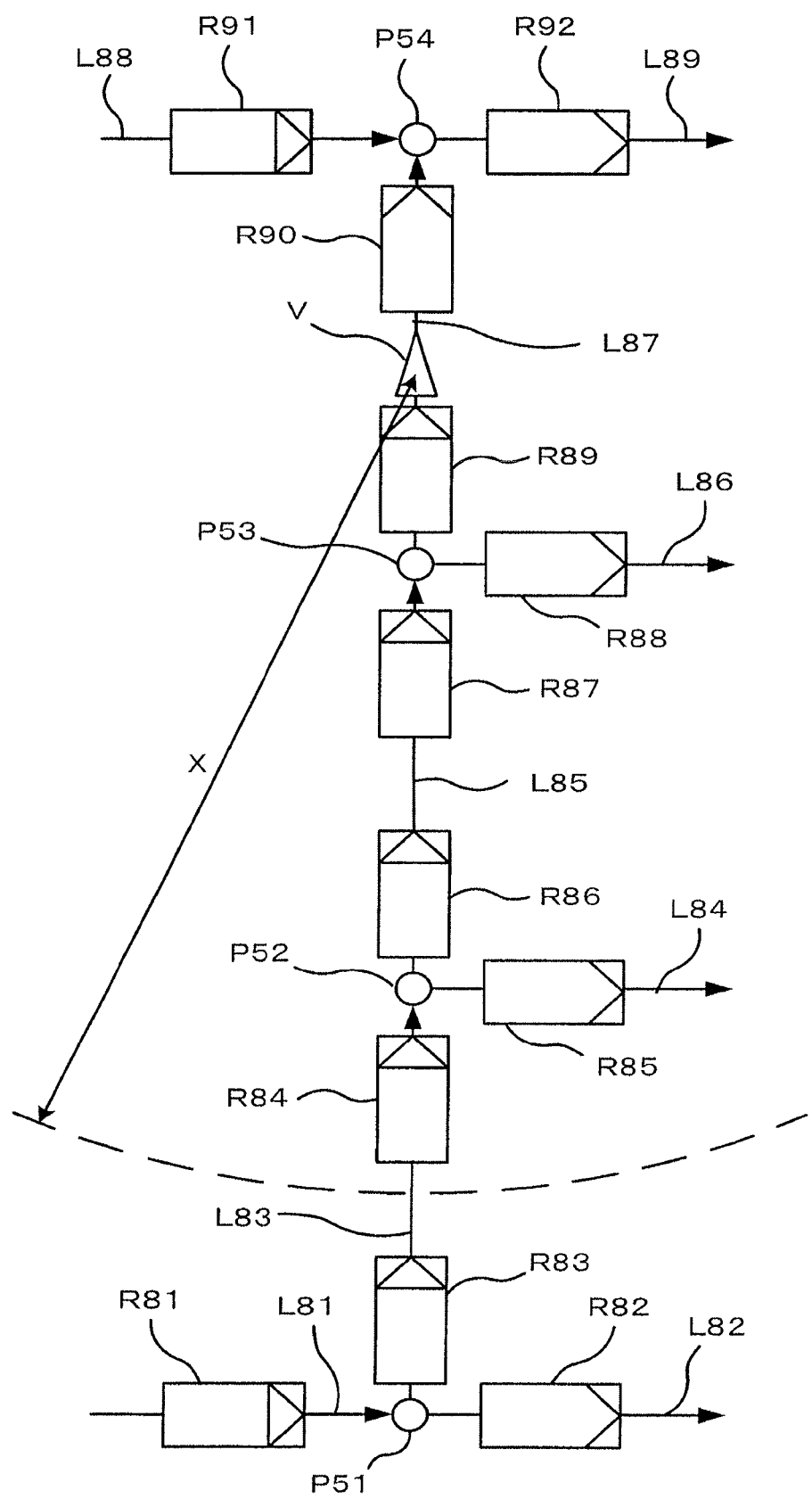

FIG. 18 shows the subject vehicle V traveling in an area within a roadmap that contains nodes P51 through P54 and road links L81 through L89. The subject vehicle V, having left the road link L81 and passed through branching point nodes P51 through P53, is currently traveling on the road link L87 and approaching a branching point node P54. In this situation, wrong-way travel decision-making areas R81 through R88 have been created for the road links L81 through L86 located rearward along the subject vehicle traveling direction.

In the example presented in FIG. 18, the subject vehicle V would never enter any of the wrong-way travel decision-making areas R81 through R83 without traveling through another wrong-way travel decision-making area (e.g., the wrong-way travel decision-making area R87). This means that the wrong-way travel decision-making areas R81 through R83 can be deleted without disabling wrong-way travel detection or compromising the wrong-way travel detection processing operation. In the wrong-way travel decision-making area deletion processing, wrong-way travel decision-making areas that can be deleted without causing any problems in the wrong-way travel detection processing operation, such as those described above, are identified and deleted. In the wrong-way travel decision-making area deletion processing, each wrong-way travel decision-making area set apart from the subject vehicle by at least a predetermined distance X, for instance, may be deleted, or each wrong-way travel decision-making area related to a branching point (e.g., P51) preceding the most recent branching point (e.g., P53), which the subject vehicle has just passed through by two positions may be deleted (R81 through R83 in this example). In either case, the wrong-way travel decision-making areas R81 through R83 will be deleted in the example presented in FIG. 18.

In reference to the flowchart presented in FIG. 19, an example of wrong-way travel decision-making area deletion processing is described. The processing shown in the flowchart presented in FIG. 19, started as power to the route guidance device 1 is turned on, is executed by the control unit 6. The wrong way decision-making area deletion processing is executed concurrently while the wrong-way travel decision-making area creation processing and the wrong-way travel detection processing are in progress, as has been explained earlier.

Upon starting execution of the wrong-way travel decision-making area deletion processing, the control unit 6 starts executing the processing in step S301. In step S301, the control unit 6 makes a decision as to whether or not there are any wrong-way travel decision-making areas having been created through the wrong-way travel decision-making area creation processing by referencing the data in the RAM in the control unit 6. If there are any wrong-way travel decision-making areas, the operation proceeds to step S302. However, if there are no wrong-way travel decision-making areas, the operation remains in step S301.

In step S302, the control unit 6 obtains vehicle position information and vehicle traveling direction information via the GPS receiver 2. Once the information is obtained, the processing in step S302 is completed and the operation proceeds to step S303.

In step S303, the control unit 6 compares the vehicle position information obtained in step S302 with the positional coordinates of each wrong-way travel decision-making area stored in the RAM or the like in the control unit 6, and extracts each wrong-way travel decision-making area set apart from the current vehicle position by a predetermined distance. Once all the distant wrong-way travel decision-making areas are extracted, the processing in step S303 is completed and the operation proceeds to step S304. It is to be noted that the predetermined distance referenced in step S303 must be greater than the predetermined distance referenced in step S106 in FIG. 13 and should be greater than the largest value of the distance between the nodes at the two ends of each road link.

In step S304, the control unit 6 deletes all the wrong-way travel decision-making areas having been extracted in step S303. Once the wrong-way travel decision-making areas are deleted, the processing in step S304 is completed and the operation returns to step S301. It is desirable that the wrong-way travel decision-making area information stored in the RAM or the like in the control unit 6 be modified at this time so as to indicate that the wrong-way travel decision-making areas have been deleted.

The following advantages are achieved through the embodiment described above.

(1) The control unit 6 in the vehicle wrong-way travel detection device achieved in the embodiment detects the subject vehicle position and the subject vehicle traveling direction via the GPS receiver 2 (in step S101 in FIG. 13, for instance), detects a node located ahead along the subject vehicle traveling direction, in reference to which subject vehicle wrong-way traveling is to be detected, based upon map information stored in the map information database 4 or the like (in step S103 in FIG. 13), creates wrong-way travel decision-making areas on roads extending from the detected node (see FIG. 14), and makes a decision as to whether or not the subject vehicle is traveling against the flow of traffic based upon the subject vehicle traveling direction when the subject vehicle is located within an immediately-effective decision-making area (see FIGS. 15 through 17). Since wrong-way travel decision-making is executed only when the subject vehicle is traveling within a wrong-way travel decision-making area, the risk of making an erroneous decision that the subject vehicle is traveling against the flow of traffic on a given road when the vehicle is actually traveling on a different road, caused by an error in the subject vehicle position information, is reduced, which, in turn, makes it possible to reduce the risk of erroneously issuing a false warning.

(2) The control unit 6 in the vehicle wrong-way travel detection device achieved in the embodiment is capable of creating three different types of wrong-way travel decision-making areas, i.e., an immediately-effective decision-making area, a standby decision-making area and a decision-making end area (see FIGS. 2 through 4). Based upon the node information, the link information and the road type information stored in the map information database 4 and the subject vehicle position information, the control unit 6 selects the appropriate type of wrong-way travel decision-making area to be created for a given road link (FIGS. 5 through 7, in steps S111 through S113 and S122 in FIG. 14), and creates wrong-way travel decision-making areas of specific types thus selected for individual road links (in steps S114, S115, S121, S123, S131 and S132 in FIG. 14). Then, when the subject vehicle travels inside a wrong-way travel decision-making area having been created, the control unit 6 executes specific processing corresponding to the particular wrong-way travel decision-making area type (see FIGS. 15 through 17). Through these measures, more precise wrong-way travel detection can be executed for a road extending from a node at which a plurality of inbound or outbound road links connect. In particular, by creating a standby decision-making area on the current subject vehicle link or an outbound link, the likelihood of issuing a false warning when an error occurs in the subject vehicle azimuth information due to an error or the like in the subject vehicle position information can be reduced.

(3) The control unit 6 in the vehicle wrong-way travel detection device achieved in the embodiment does not create a wrong-way travel decision-making area on a road link inside rest stop facilities such as a service area or a parking area. As a result, no false warning is issued when the subject vehicle is traveling within, for instance, a parking lot of a rest stop facility (see FIG. 10).

(4) As the subject vehicle approaches a regular road or a toll collecting station, the control unit 6 in the vehicle wrong-way travel detection device achieved in the embodiment creates a decision-making end area on a road link in the road on which the subject vehicle is currently traveling (in steps S111 and S121 in FIG. 14), and ends the toll road wrong-way travel decision-making processing once the subject vehicle passes through the decision-making end area thus created (see FIG. 15). Accordingly, when the subject vehicle having passed through the toll collecting station turns back toward the toll road at an interchange or the like, it is ensured that an erroneous decision that the subject vehicle is traveling against the flow of traffic through a wrong-way travel decision-making area created for the road link representing the opposite lane, attributable to an error in the subject vehicle position information or the like, is not made.

(5) The control unit 6 in the vehicle wrong-way travel detection device achieved in the embodiment deletes wrong-way travel decision-making areas set apart from the current subject vehicle position by a predetermined distance or more based upon the subject vehicle position information and the wrong-way travel decision-making area position information (see FIGS. 18 and 19). Through these measures, it is ensured that the control unit 6 never needs to operate under an excessively heavy processing load due to a great number of wrong-way travel decision-making areas having been created as the vehicle travels on a toll road over an extended length of time.

(6) The control unit 6 in the vehicle wrong-way travel detection device achieved in the embodiment is able to output a warning information as a sound message or a visual message via the output unit 5 upon determining that the subject vehicle is traveling against the flow of traffic through the wrong-way travel warning processing (in step S224 in FIG. 17). These measures provide an effective means for alerting the driver when the vehicle is traveling against the flow of traffic.

The embodiment described above allows for the following variations.

(1) The embodiment has been described in reference to FIG. 5 on an example in which the subject vehicle V is approaching a node P11 located ahead along the traveling direction through an inbound link. When there is an error in the subject vehicle position information or the driver has been unaware of a wrong-way travel warning, the subject vehicle V may end up approaching a node through an outbound link. In consideration of such a case, an immediately-effective decision-making area may be created on the road link on which the subject vehicle is currently located.

(2) In the embodiment, the wrong-way travel decision-making areas having been created are stored into the RAM in the control unit 6, however, the present invention is not limited to this example. For instance, the wrong-way travel decision-making areas may instead be stored into a non-volatile storage device such as a hard disk. In such a case, as the subject vehicle, having been parked, is started up again, decision-making processing can be executed by using the wrong-way travel decision-making areas having been created before it was parked. Consequently, even if correct wrong-way travel decision-making areas cannot be created following the vehicle restart due to an error in the subject vehicle position information, wrong-way travel detection can be executed in reference to the wrong-way travel decision-making areas having been created before the vehicle was parked. For instance, the wrong-way travel decision-making area R59 in FIG. 11 may not be created due to an error in the subject vehicle position information. Under such circumstances, wrong-way travel detection can still be executed if the wrong-way travel decision-making area R54 in FIG. 10 remaining in the non-volatile storage device.

(3) While the embodiment has been described by assuming that the present invention is adopted in wrong-way travel detection executed while the subject vehicle is traveling on a toll road, the present invention is not limited to this example and may be adopted in wrong-way travel detection executed in conjunction with a regular road with unidirectional traffic flow. When the present invention is adopted in conjunction with a one-way road, the decision-making end area should be created for a road link that is not a one-way road.

(4) While the embodiment has been described by assuming that a wrong-way travel decision-making area is created at the position based upon the wrong-way travel decision-making area position information stored in the map information database 4, the position at which a wrong-way travel decision-making area is to be created may instead be calculated based upon the node information, the link information or the like. For instance, wrong way decision-making areas may each be created as a fan-shaped area formed by dividing a circle centered on the point indicated by the positional coordinates of the forward node along the direction in which the corresponding link extends, or as a road area assuming a width greater than the width of the road that runs along the corresponding link extending from the forward node.

(5) While no wrong-way travel decision-making area is created for a regular road in the toll road wrong-way travel decision-making processing executed in the embodiment, wrong-way travel decision-making areas may be created on regular roads as well. For instance, the decision-making end area may be created on a road link of a regular road extending from a regular road connecting node.

(6) While a warning is issued as a sound message or a visual message in the embodiment, the present invention is not limited to these examples and a warning may be issued in any form that can be perceived by the driver.

(7) While the subject vehicle traveling direction is ascertained via the GPS receiver 2 in the embodiment, the present invention is not limited to this example and subject vehicle traveling direction information may be obtained via a gyro sensor or the like.

The embodiment described above and variations thereof are simply provided as examples and components other than those in the embodiment may be used as long as the features characterizing the present invention are not compromised.

It is to be noted that the embodiment described above simply represents an example and the present invention is in no way limited to this example as long as the features characterizing the present invention remain intact. Any other embodiment conceivable within the technical scope of the present invention should, therefore, be considered to be within the range of the present invention.

The invention claimed is:

1. A vehicle wrong-way travel detection device, comprising:
    a vehicle position detector that detects a position of a vehicle;
    a traveling direction detector that detects a vehicle traveling direction along which the subject vehicle is traveling;
    a storage device where map information is stored;
    a control unit that executes various types of processings; and
    an output unit that outputs various types of information, wherein:
    the control unit:
        creates a wrong-way travel decision-making area to be used to make a decision as to whether or not the vehicle is traveling against a traffic flow;
        makes a decision as to whether or not the vehicle is traveling against the traffic flow when the position of the vehicle detected by the vehicle position detector is within the wrong-way travel decision-making area; and
        deletes the created wrong-way travel decision-making area when a predetermined condition is satisfied, and
    the output unit outputs information to warn a user that the vehicle is traveling against the traffic flow when the control unit has decided that the vehicle is traveling against the traffic flow.

2. A vehicle wrong-way travel detection device according to claim 1, wherein:
    the predetermined condition is satisfied when the position of the vehicle detected by the vehicle position detector is near a toll collecting station.

3. A vehicle wrong-way travel detection device according to claim 2, wherein:
    the control unit makes a decision, based upon the vehicle traveling direction detected by the traveling direction detector, as to whether or not the vehicle is traveling against the traffic flow when the position of the vehicle detected by the vehicle position detector is within the wrong-way travel decision-making area.

4. A vehicle wrong-way travel detection device according to claim 2, wherein:
    the control unit makes a decision, based upon the vehicle traveling direction detected by the traveling direction detector and a designated traffic direction of a road on which the vehicle is traveling, as to whether or not the vehicle is traveling against the traffic flow when the position of the vehicle detected by the vehicle position detector is within the wrong-way travel decision-making area.

5. A vehicle wrong-way travel detection device according to claim 1, wherein:
    the predetermined condition is satisfied when the position of the vehicle detected by the vehicle position detector is near a connecting point with a road that is different in type from a road on which the vehicle is traveling.

6. A vehicle wrong-way travel detection device according to claim 5, wherein:
    the control unit makes a decision, based upon the vehicle traveling direction detected by the traveling direction detector, as to whether or not the vehicle is traveling against the traffic flow when the position of the vehicle detected by the vehicle position detector is within the wrong-way travel decision-making area.

7. A vehicle wrong-way travel detection device according to claim 5, wherein:
    the control unit makes a decision, based upon the vehicle traveling direction detected by the traveling direction detector and a designated traffic direction of a road on which the vehicle is traveling, as to whether or not the vehicle is traveling against the traffic flow when the position of the vehicle detected by the vehicle position detector is within the wrong-way travel decision-making area.

8. A vehicle wrong-way travel detection device according to claim 1, wherein:
    the predetermined condition is satisfied when a distance between the position of the vehicle detected by the vehicle position detector and the wrong-way travel decision-making area is equal to or greater than a predetermined distance value.

9. A vehicle wrong-way travel detection device according to claim 8, wherein:
    the control unit makes a decision, based upon the vehicle traveling direction detected by the traveling direction detector, as to whether or not the vehicle is traveling against the traffic flow when the position of the vehicle detected by the vehicle position detector is within the wrong-way travel decision-making area.

10. A vehicle wrong-way travel detection device according to claim 8, wherein:
    the control unit makes a decision, based upon the vehicle traveling direction detected by the traveling direction detector and a designated traffic direction of a road on which the vehicle is traveling, as to whether or not the vehicle is traveling against the traffic flow when the position of the vehicle detected by the vehicle position detector is within the wrong-way travel decision-making area.

* * * * *